US012803140B2

(12) United States Patent
Bao et al.

(10) Patent No.: US 12,803,140 B2
(45) Date of Patent: Nov. 17, 2026

(54) PHASE SHIFTER AND ANTENNA

(71) Applicant: Shanghai Tianma Microelectronics Co., Ltd., Shanghai (CN)

(72) Inventors: Yifan Bao, Shanghai (CN); Taohua Chen, Shanghai (CN); Yifan Xing, Shanghai (CN); Baiquan Lin, Shanghai (CN); Xiaonan Han, Shanghai (CN); Xin Xu, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 0 days.

(21) Appl. No.: 19/250,118

(22) Filed: Jun. 26, 2025

(65) Prior Publication Data

US 2025/0323403 A1 Oct. 16, 2025

(30) Foreign Application Priority Data

Dec. 13, 2024 (CN) ......................... 202411850055.1

(51) Int. Cl.
*H01P 1/18* (2006.01)
*H01Q 3/36* (2006.01)

(52) U.S. Cl.
CPC *H01P 1/18* (2013.01); *H01Q 3/36* (2013.01)

(58) Field of Classification Search
CPC .............................. H01P 1/18; H01Q 3/26–30
See application file for complete search history.

(56) References Cited

U.S. PATENT DOCUMENTS 12,469,940 B2 * 11/2025 Ding ......................... G02F 1/13
12,482,911 B2 * 11/2025 Cui ........................... H01P 1/18
12,489,183 B2 * 12/2025 Pan ........................... H01P 1/18

* cited by examiner

*Primary Examiner* — Hasan Islam
(74) *Attorney, Agent, or Firm* — Wiersch Law Group

(57) ABSTRACT

Provided are phase shifter and antenna. Phase-shifter wiring of phase shifter includes transmission unit which includes first wiring segment and second wiring segment connected to each other. First via-hole is disposed on grounding electrode layer. In direction perpendicular to plane of grounding electrode layer, first via-hole covers first wiring segment, and grounding electrode layer covers second wiring segment. Along first direction perpendicular to extension direction of phase-shifter wiring, length of second wiring segment is greater than length of first wiring segment. In phase shifter and antenna, equivalent inductance and equivalent capacitance are introduced on phase-shifter wiring through defected ground structure and parallel stub structure to realize slow-wave effect, so that length of phase-shifter wiring can be significantly shortened, thereby reducing length of transmission path of radio frequency signal on phase-shifter wiring, decreasing loss of radio frequency signal on phase-shifter wiring, and improving beam quality and radiation power of antenna.

20 Claims, 8 Drawing Sheets

PHASE SHIFTER AND ANTENNA

CROSS-REFERENCE TO RELATED APPLICATION

The present application claims priority to Chinese Patent Application No. 202411850055.1, filed on Dec. 13, 2024, the content of which is incorporated herein by reference in its entirety.

TECHNICAL FIELD

The present disclosure relates to the field of communication technologies, and in particular, to a phase shifter and an antenna.

BACKGROUND

A phase shifter is a key component for adjusting the phase of a radio frequency signal and is widely used in satellite communications and 5G millimeter-wave base stations. The main function of the phase shifter is to control the propagation characteristics of electromagnetic waves by changing the phase of the signal. In a phased-array antenna system, the phase shifter is particularly important as it determines the phase difference between a plurality of antenna elements, thereby affecting the superposition direction and beam pointing of electromagnetic waves.

The phase shifter can be used in a phased-array antenna to maximize the signal sensitivity or transmission power in a certain direction. To enhance the electromagnetic radiation in a certain direction, the phased-array antenna includes a plurality of closely-distributed radiating electrodes. The phase difference of the signals transmitted or received by these radiating electrodes can be predetermined to maximize the signal superposition in a specific direction, thereby enhancing the signal sensitivity or transmission power in that direction.

However, existing phase shifters have the problem of large signal loss, which affects the beam quality and radiation power of the antenna.

SUMMARY

Provided are a phase shifter and an antenna to reduce signal loss, which improve the beam quality and radiation power of the antenna.

According to one aspect of the present disclosure, it provides a phase shifter including at least one phase-shifting unit;

- the phase-shifting unit includes a phase-shifter wiring, an adjustable dielectric layer, and a grounding electrode layer, the phase-shifter wiring and the grounding electrode layer are disposed opposite to each other, and the adjustable dielectric layer is located between the phase-shifter wiring and the grounding electrode layer;
- the phase-shifter wiring includes at least one transmission unit;
- the transmission unit includes a first wiring segment and a second wiring segment that are connected to each other, and a first via-hole is disposed on the grounding electrode layer;
- along a direction perpendicular to a plane of the grounding electrode layer, the first via-hole covers the first wiring segment, and the grounding electrode layer covers the second wiring segment;
- along a first direction, a length of the second wiring segment is greater than a length of the first wiring segment; and
- the first direction is perpendicular to an extension direction of the phase-shifter wiring.

According to another aspect of the present disclosure, there is provided an antenna including the phase shifter as described in the first aspect.

It should be understood that the content described in this section is not intended to identify the key or important features of the embodiments of the present disclosure, nor is it used to limit the scope of the present disclosure. Other features of the present disclosure will be easily understood through the following description.

BRIEF DESCRIPTION OF DRAWINGS

To more clearly illustrate the technical solutions in the embodiments of the present disclosure, the following will briefly introduce the drawings required to be used in the description of the embodiments. Obviously, the drawings in the following description are only some embodiments of the present disclosure. For those of ordinary skill in the art, other drawings can be obtained from these drawings without creative efforts.

DESCRIPTION OF EXAMPLES

To enable those of skill in the art to better understand the solutions of the present disclosure, the following clearly and completely describes the technical solutions in the embodiments of the present disclosure in conjunction with the drawings in the embodiments of the present disclosure. Obviously, the described embodiments are only some of the embodiments of the present disclosure, rather than all of them. Based on the embodiments in the present disclosure, all other embodiments obtained by those of ordinary skill in the art without creative efforts shall fall within the protection scope of the present disclosure.

It should be noted that the terms "first", "second", etc. in the description, claims, and above-mentioned drawings of the present disclosure are used to distinguish similar objects, and are not necessarily used to describe a specific order or sequence. It should be understood that the terms used in this way can be interchanged under appropriate circumstances, so that the embodiments of the present disclosure described herein can be implemented in an order other than those illustrated or described herein. In addition, the terms "include" and "have" and any variations thereof are intended to cover non-exclusive inclusions. For example, a process, method, system, product, or device that includes a series of steps or units is not necessarily limited to those steps or units clearly listed, but may include other steps or units that are not clearly listed or are inherent to the process, method, product, or device.

Figure 1:
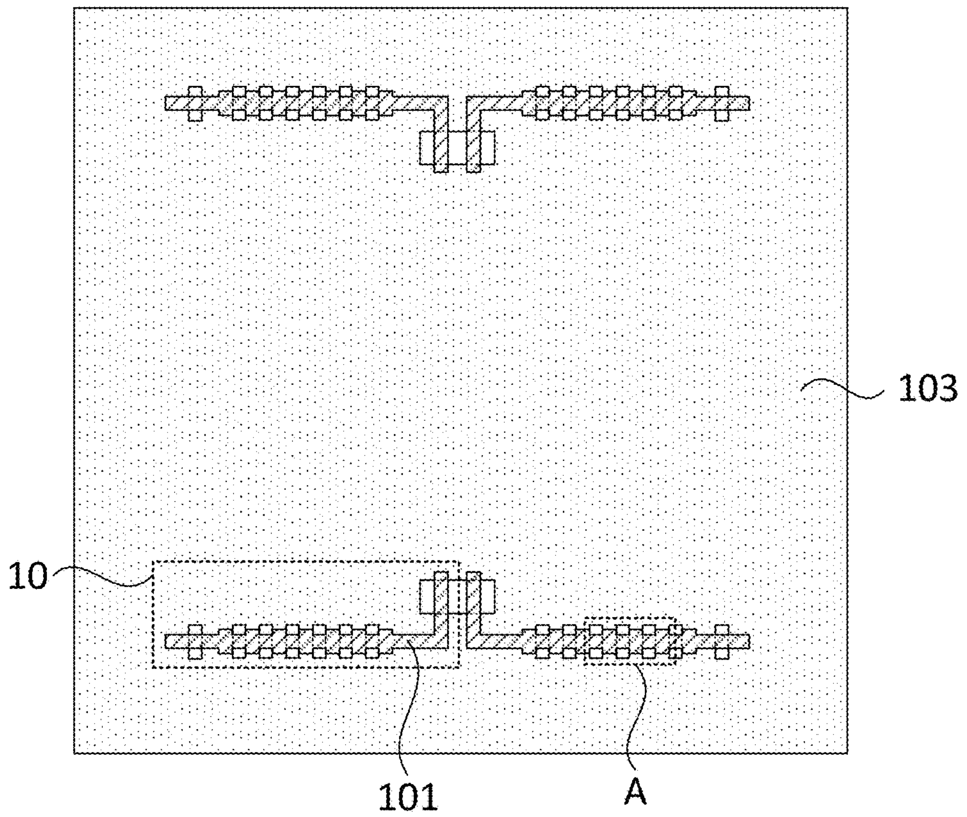
FIG. 1 is a structural schematic diagram of a phase shifter provided by an embodiment of the present disclosure.
Figure 2:
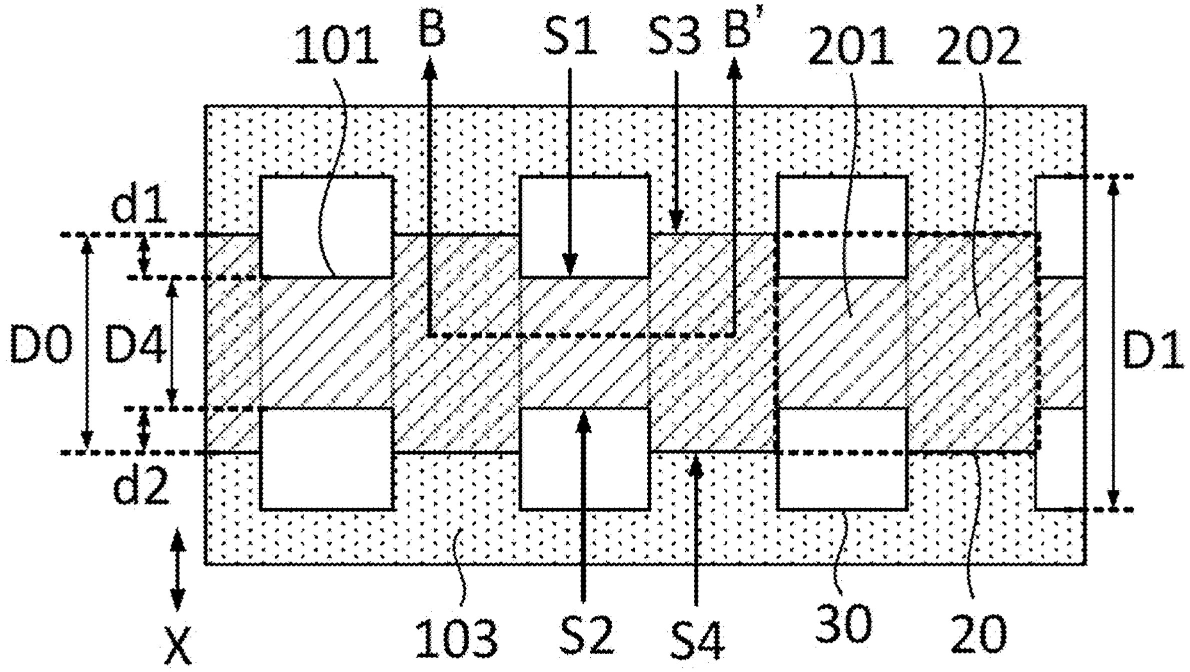
FIG. 2 is an enlarged structural schematic diagram of a part A in FIG. 1.
Figure 3:
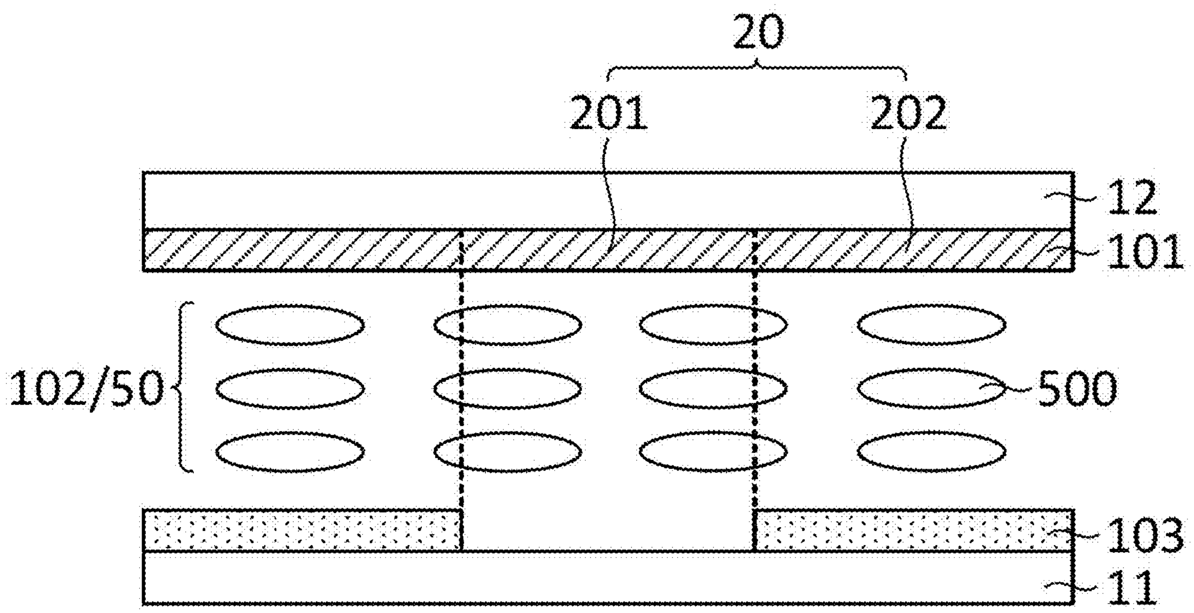
FIG. 3 is a schematic diagram of a cross-sectional structure taken along a direction B-B' in FIG. 2.

FIG. 1 is a structural schematic diagram of a phase shifter provided by an embodiment of the present disclosure, FIG. 2 is an enlarged structural schematic diagram of a part A in FIG. 1, and FIG. 3 is a schematic diagram of a cross-sectional structure taken along a direction B-B' in FIG. 2. As shown in FIGS. 1-3, the phase shifter provided by the embodiment of the present disclosure includes at least one phase-shifting unit 10. The phase-shifting unit 10 includes a phase-shifter wiring 101, an adjustable dielectric layer 102, and a grounding electrode layer 103. The phase-shifter wiring 101 and the grounding electrode layer 103 are disposed opposite to each other, and the adjustable dielectric layer 102 is located between the phase-shifter wiring 101 and the grounding electrode layer 103. The phase-shifter wiring 101 includes at least one transmission unit 20. The transmission unit 20 includes a first wiring segment 201 and a second wiring segment 202 that are connected to each other. A first via-hole 30 is disposed on the grounding electrode layer 103. Along a direction perpendicular to a plane of the grounding electrode layer 103, the first via-hole 30 covers the first wiring segment 201, and the grounding electrode layer 103 covers the second wiring segment 202. Along a first direction X, a length of the second wiring segment 202 is greater than a length of the first wiring segment 201. The first direction X is perpendicular to an extension direction of the phase-shifter wiring 101.

Specifically, as shown in FIGS. 1-3, the phase shifter includes at least one phase-shifting unit 10, and each phase-shifting unit 10 includes one phase-shifter wiring 101. The phase-shifter wiring 101 is configured to transmit a radio frequency signal, and the phase-shifting unit 10 is configured to implement the phase-shifting function of the radio frequency signal transmitted on the phase-shifter wiring 101.

The phase shifter may include a plurality of phase-shifting units 10 arranged in an array to simultaneously shift the phases of the radio frequency signals transmitted on a plurality of phase-shifter wirings 101, control the phase of the radio frequency signal in each of the phase-shifting unit 10, and in turn control the direction of the radiation beam of the antenna by controlling the phase difference between the phase shifting units 10, thereby achieving efficient beam scanning.

It should be noted that FIG. 1 only shows an example where the phase shifter includes 4 phase-shifting units 10. In other embodiments, the number and layout of the phase-shifting units 10 can be set by those of skill in the art according to actual needs and are not limited in the embodiments of the present disclosure.

Continuing to refer to FIGS. 1-3, the phase-shifting unit 10 includes the phase-shifter wiring 101 and the grounding electrode layer 103 that are disposed opposite to each other. The adjustable dielectric layer 102 is disposed between the phase-shifter wiring 101 and the grounding electrode layer 103. The radio frequency signal transmitted on the phase-shifter wiring 101 is transmitted in the adjustable dielectric layer 102 between the phase-shifter wiring 101 and the grounding electrode layer 103.

The adjustable dielectric layer 102 is made of a dielectric material with an adjustable dielectric constant. The dielectric constant of the adjustable dielectric layer 102 can be dynamically adjusted by applying different light or voltages.

The change in the dielectric constant of the adjustable dielectric layer 102 will affect the propagation speed and phase of the radio frequency signal in the adjustable dielectric layer 102. For example, a higher dielectric constant will slow down the propagation speed of the radio frequency signal, resulting in a larger phase delay; conversely, a lower dielectric constant will make the radio frequency signal propagate faster, reducing the phase delay.

Therefore, by precisely controlling the dielectric constant of the adjustable dielectric layer 102, the radio frequency signal transmitted on the phase-shifter wiring 101 can be phase-shifted, thereby changing the phase of the radio frequency signal and realizing the phase-shifting function of the radio frequency signal.

It should be noted that the material of the adjustable dielectric layer 102 can be set according to actual needs and is not specifically limited in the embodiments of the present disclosure.

Optionally, as shown in FIGS. 1-3, taking a liquid crystal phase shifter (LCPS) as an example for illustration, the adjustable dielectric layer 102 includes a liquid crystal layer 50. In this case, a driving voltage can be applied through the phase-shifter wiring 101 to form an electric field between the phase-shifter wiring 101 and the grounding electrode layer 103. The electric field can drive the liquid crystal molecules 500 in the liquid crystal layer 50 to deflect, thereby changing the dielectric constant of the liquid crystal layer 50 and realizing the dynamic adjustment of the dielectric constant of the adjustable dielectric layer 102.

The driving voltage can also be applied through other wirings other than the phase-shifter wiring 101 to form the electric field between the phase-shifter wiring 101 and the grounding electrode layer 103. This is not specifically limited in the embodiments of the present disclosure.

In other embodiments, the adjustable dielectric layer 102 may also include a photo-dielectric layer. In this case, by introducing light of different intensities or wavelengths into the photo-dielectric layer, the structure and morphology of the material molecules in the photo-dielectric layer can be changed, and in turn the anisotropy of the physical properties of the material of the photo-dielectric layer can be modulated, changing the dielectric constant of the photo-dielectric layer, thereby realizing the dynamic adjustment of the dielectric constant of the adjustable dielectric layer 102.

The material of the photo-dielectric layer may include liquid crystal polymers, azo dyes, or azo polymers, etc. and is not specifically limited in the embodiments of the present disclosure.

Continuing to refer to FIGS. 1-3, optionally, the phase shifter includes a first substrate 11 and a second substrate 12 that are disposed opposite to each other. The phase-shifting unit 10 can be disposed between the first substrate 11 and the second substrate 12. The first substrate 11 and the second substrate 12 can provide stable mechanical support for the phase-shifting unit 10, enhancing the strength and durability of the phase shifter and making manufacturing easy.

Specifically, as shown in FIGS. 1-3, the grounding electrode layer 103 in the phase-shifting unit 10 can be fabricated on the first substrate 11, the phase-shifter wiring 101 can be fabricated on the second substrate 12, and the adjustable dielectric layer 102 is filled between the first substrate 11 and the second substrate 12.

Optionally, the first substrate 11 and the second substrate 12 can be glass substrates or printed circuit boards (PCBs) to ensure the efficiency of signal transmission and provide good mechanical strength. The glass substrate can achieve higher fabrication precision and also has higher transparency, making the appearance of the antenna more aesthetic; and the printed circuit boards are beneficial for circuit arrangement. The printed circuit boards can use high-frequency substrates, so that the frequency can be above 1 GHz. By using low-loss high-frequency substrates, the loss of the radio frequency signal caused by the printed circuit boards can be effectively reduced, and the performance of the antenna can be improved. This is not specifically limited in the embodiments of the present disclosure.

Further, the inventors have found through research that the longer the propagation distance of the radio frequency signal on the phase-shifter wiring 101, the greater the accumulated phase delay, and the larger the adjustable range of the phase. Therefore, to achieve the expected adjustable range of the phase difference, a longer phase-shifter wiring 101 usually needs to be arranged to provide sufficient phase change. However, as the length of the phase-shifter wiring 101 increases, the propagation path of the radio frequency signal on the phase-shifter wiring 101 becomes longer, which in turn may increase the loss of the radio frequency signal on the phase-shifter wiring 101, and finally affects the beam quality and radiation power of the antenna.

Based on the above technical problems, in this embodiment, as shown in FIGS. 1-3, the phase-shifter wiring 101 is configured to include at least one transmission unit 20, and each transmission unit 20 is composed of two interconnected wiring segments.

At the same time, the first via-hole 30 is disposed on the grounding electrode layer 103. In the direction perpendicular to the plane of the grounding electrode layer 103, the wiring segment in the transmission unit 20 that overlaps with the first via-hole 30 is the first wiring segment 201, and the wiring segment in the transmission unit 20 that overlaps with the grounding electrode layer 103 is the second wiring segment 202.

The first via-hole 30 and the first wiring segment 201 form a defected ground structure. By disposing the first via-hole 30 on the grounding electrode layer 103, the return current on the grounding electrode layer 103 cannot flow along the original path but is forced to bypass the first via-hole 30, thereby changing the return path of the return current on the grounding electrode layer 103 and making the actual path of the return current longer. Since the inductance is proportional to the path length of the current, disposing the defected ground structure in the transmission unit 20 is equivalent to connecting an equivalent inductance in series on the phase-shifter wiring 101, thereby increasing the distributed inductance on the phase-shifter wiring 101.

Further, a parallel stub structure is formed between the second wiring segment 202 and the grounding electrode layer 103 overlapping therewith. As shown in FIGS. 1-3, in the direction perpendicular to the extension direction of the phase-shifter wiring 101, or in the direction perpendicular to the transmission direction of the radio frequency signal on the phase-shifter wiring 101 (i.e., the first direction X), a length DO of the second wiring segment 202 is greater than a length D4 of the first wiring segment 201, so that an additional conductor stub is introduced on at least one side of the phase-shifter wiring 101. This additional conductor stub can increase the capacitive coupling area between the second wiring segment 202 and the grounding electrode layer 103. Therefore, disposing the parallel stub structure in the transmission unit 20 is equivalent to introducing a parallel capacitive branch on the phase-shifter wiring 101, which can increase the distributed capacitance of the phase-shifter wiring 101.

Figure 4:
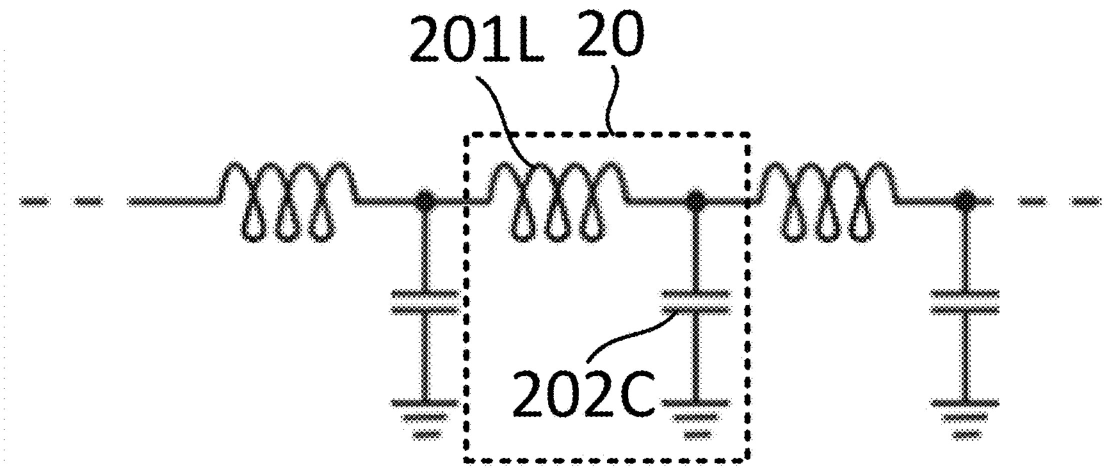
FIG. 4 is a schematic diagram of an equivalent circuit of a transmission unit provided by an embodiment of the present disclosure.

FIG. 4 is a schematic diagram of an equivalent circuit of a transmission unit provided by an embodiment of the present disclosure. As shown in FIGS. 1-4, in the transmission unit 20, the defected ground structure can be equivalent to adding a series equivalent inductance 201L on the phase-shifter wiring 101, and the parallel stub structure can be equivalent to adding a parallel equivalent capacitance 202C on the phase-shifter wiring 101.

When the radio frequency signal is transmitted, the formula $$v\phi = \sqrt{\frac{1}{L \times C}} = f \times \lambda$$

can be satisfied;

where vϕ is the phase velocity, that is, the propagation speed of the radio frequency signal in the phase-shifter wiring 101.

L is the distributed inductance, which refers to the inductance value per unit length.

C is the distributed capacitance, which refers to the capacitance value per unit length.

f is the frequency of the radio frequency signal.

λ is the wavelength of the radio frequency signal.

It can be seen from above that by disposing the defected ground structure and the parallel stub structure in the transmission unit 20 to introduce the equivalent inductance 201L and the equivalent capacitance 202C on the phase-shifter wiring 101, the distributed inductance L and distributed capacitance C on the phase-shifter wiring 101 are increased. The increase in the distributed inductance L and distributed capacitance C can reduce the phase velocity vϕ and realize the slow-wave effect. Then, under the condition that the frequency f remains unchanged, the wavelength λ will also decrease. In this way, the same or larger phase change can be achieved in a shorter physical length, so that the length of the phase-shifter wiring 101 can be significantly shortened, thereby reducing the length of the transmission path of the radio frequency signal on the phase-shifter wiring 101, reducing the loss of the radio frequency signal on the phase-shifter wiring 101, and in turn improving the beam quality and radiation power of the antenna.

Further, the performance index of the phase shifter can be evaluated by the figure of merit (FoM). The figure of merit FOM satisfies the formula $FoM-\Delta\Phi_{b,max}/IL_{max}$.

Where $\Delta\Phi_{b,max}$ represents the maximum phase shift of the phase shifter, which is the maximum phase change that the phase shifter can achieve, usually in degrees (°) or radians (rad).

$IL_{max}$ represents the maximum insertion loss of the phase shifter, and the insertion loss refers to the power loss of the signal when passing through the phase shifter, usually in decibels (dB).

As mentioned above, in the embodiment of the present disclosure, by disposing the defected ground structure and the parallel stub structure in the transmission unit 20, increasing the distributed inductance L and distributed capacitance C on the phase-shifter wiring 101, reducing the phase velocity vϕ, and realizing the slow-wave effect, the same or larger phase change can be achieved in a shorter physical length, so that the length of the phase-shifter wiring 101 can be significantly shortened, and the loss of the radio frequency signal on the phase-shifter wiring 101 can be reduced. This is beneficial to increasing the maximum phase shift $\Delta\Phi_{b,max}$ of the phase shifter and reducing the maximum insertion loss $IL_{max}$ of the phase shifter, achieving a higher figure of merit FoM, and improving the comprehensive performance of the phase shifter.

In addition, in the embodiment of the present disclosure, only the pattern shape of the phase-shifter wiring 101 needs to be changed, and the first via-hole 30 is correspondingly disposed on the grounding electrode layer 103. Excessive processing steps need not be increased additionally during manufacturing, the manufacturing difficulty is low, and it is easy to implement.

To sum up, in the phase shifter provided by the embodiments of the present disclosure, the phase-shifter wiring is configured to include at least one transmission unit, and by disposing the defected ground structure and the parallel stub structure in the transmission unit, the equivalent inductance and the equivalent capacitance are introduced on the phase-shifter wiring, increasing the distributed inductance and distributed capacitance on the phase-shifter wiring, reducing the phase velocity and wavelength, and realizing the slow-wave effect. In this way, the same or larger phase change can be achieved in a shorter physical length, so that the length of the phase-shifter wiring can be significantly shortened, thereby reducing the length of the transmission path of the radio frequency signal on the phase-shifter wiring, reducing the loss of the radio frequency signal on the phase-shifter wiring, and in turn improving the beam quality and radiation power of the antenna.

Continuing to refer to FIG. 2, optionally, along the first direction X, the first wiring segment 201 includes a first boundary S1 and a second boundary S2 that are disposed opposite to each other, and the second wiring segment 202 includes a third boundary S3 and a fourth boundary S4 that are disposed opposite to each other. Along the first direction X, the third boundary S3 is located on one side of the first boundary S1 away from the second boundary S2, and the fourth boundary S4 is located on one side of the second boundary S2 away from the first boundary S1.

Specifically, as shown in FIG. 2, the first boundary S1 and the second boundary S2 are two opposite boundaries of the first wiring segment 201. The first boundary S1 and the second boundary S2 are arranged in the direction perpendicular to the extension direction of the phase-shifter wiring 101 (i.e., the first direction X), and the extension directions of the first boundary S1 and the second boundary S2 can be parallel to the extension direction of the phase-shifter wiring 101.

The third boundary S3 and the fourth boundary S4 are two opposite boundaries of the second wiring segment 202. The arrangement direction of the third boundary S3 and the fourth boundary S4 is perpendicular to the extension direction of the phase-shifter wiring 101 (i.e., the first direction X), and the extension directions of the third boundary S3 and the fourth boundary S4 can be parallel to the extension direction of the phase-shifter wiring 101.

Continuing to refer to FIG. 2, in this embodiment, along the direction perpendicular to the extension direction of the phase-shifter wiring 101, or along the direction perpendicular to the transmission direction of the radio frequency signal on the phase-shifter wiring 101 (i.e., the first direction X), the third boundary S3 and the fourth boundary S4 are both located outside the first wiring segment 201. In this way, the length DO of the second wiring segment 202 in the first direction X can be greater than the length D4 of the first wiring segment 201 in the first direction X, so that additional conductor stubs are introduced on both sides of the phase-shifter wiring 101, increasing the capacitive coupling area between the second wiring segment 202 and the grounding electrode layer 103, thereby increasing the distributed capacitance of the phase-shifter wiring 101, reducing the phase velocity vϕ and wavelength λ, and realizing the slow-wave effect, so as to achieve the same or larger phase change in a shorter physical length, so that the length of the phase-shifter wiring 101 can be significantly shortened, the loss of the radio frequency signal on the phase-shifter wiring 101 is reduced, and the beam quality and radiation power of the antenna are improved.

By introducing conductor stubs on both sides of the phase-shifter wiring 101, compared with introducing a conductor stub on only one side of the phase-shifter wiring 101, a larger capacitive coupling area can be achieved in a limited space, thereby achieving a larger equivalent capacitance in the same space, which is beneficial to improving the integration of the phase shifter, reducing the occupied space of the phase-shifter wiring 101, and realizing a miniaturized design.

Continuing to refer to FIG. 2, optionally, along the first direction X, a distance d1 between the third boundary S3 and the first boundary S1 is equal to a distance d2 between the fourth boundary S4 and the second boundary S2.

Specifically, as shown in FIG. 2, by setting the distance d1 between the third boundary S3 of the second wiring segment 202 and the first boundary S1 of the first wiring segment 201 in the first direction X to be equal to the distance d2 between the fourth boundary S4 of the second wiring segment 202 and the second boundary S2 of the first wiring segment 201 in the first direction X, in the direction perpendicular to the extension direction of the phase-shifter wiring 101 (i.e., the first direction X), the conductor stubs introduced on both sides of the phase-shifter wiring 101 are symmetrically distributed with respect to the first wiring segment 201. Such a setting helps to achieve a larger capacitive coupling area in a limited space, thereby realizing a larger equivalent capacitance, which is beneficial to further reducing the occupied space of the phase-shifter wiring 101, improving the integration of the phase shifter, and realizing a miniaturized design.

Figure 5:
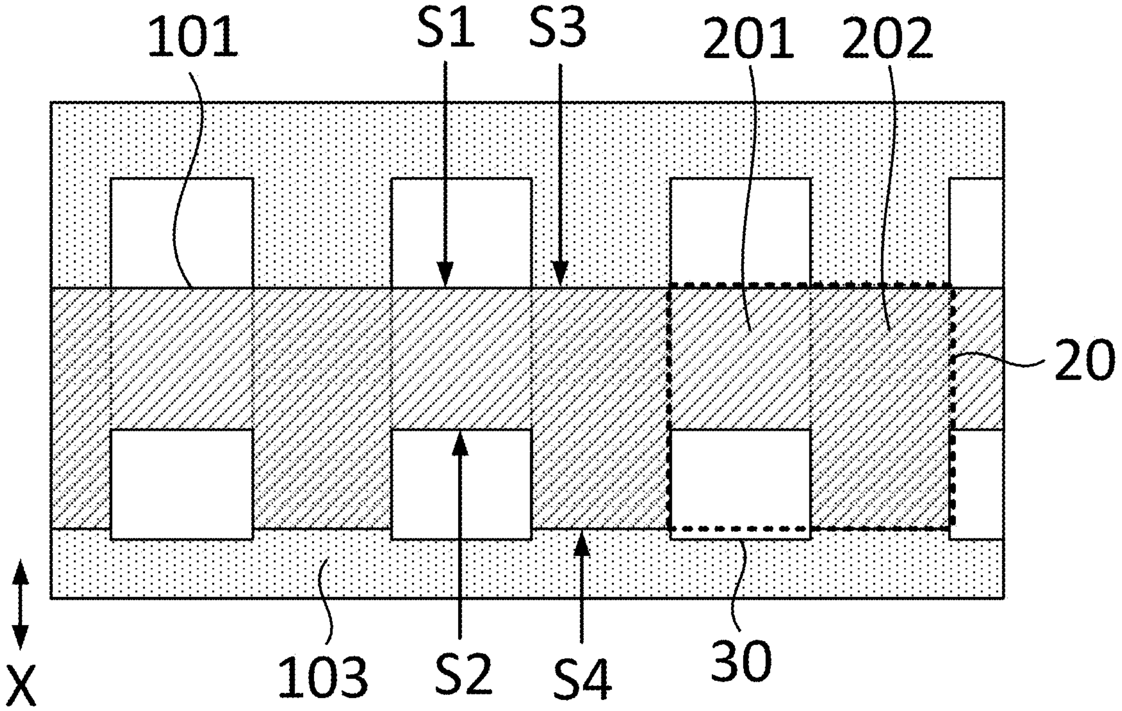
FIG. 5 is a schematic diagram of a partial structure of a phase shifter provided by an embodiment of the present disclosure.
Figure 6:
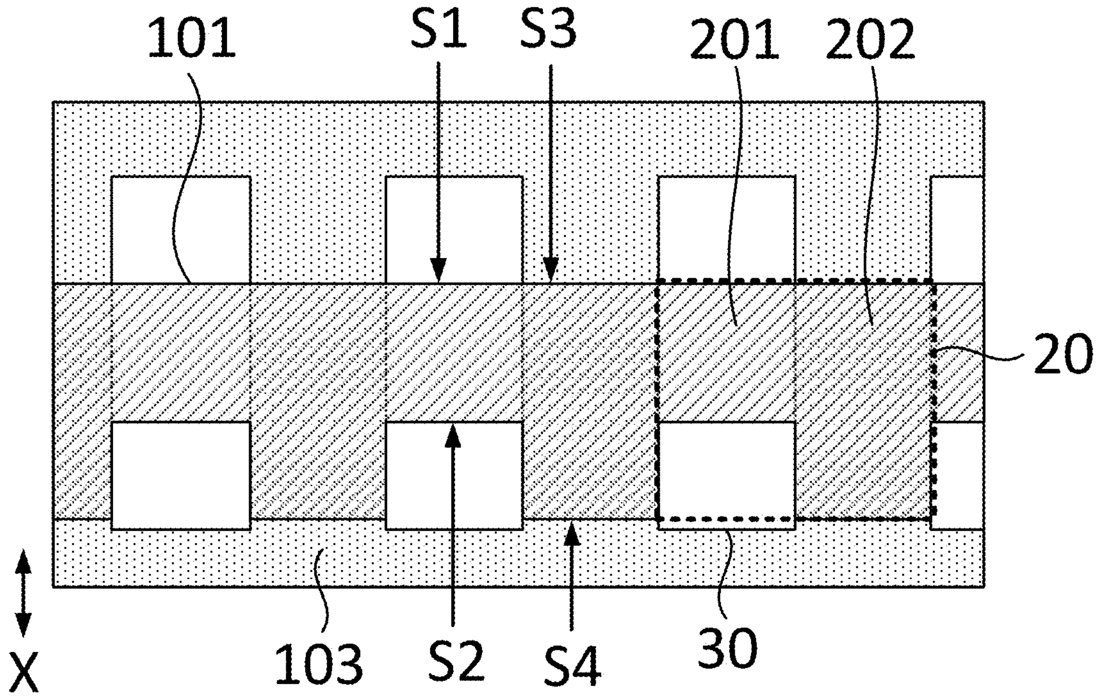
FIG. 6 is a schematic diagram of a partial structure of another phase shifter provided by an embodiment of the present disclosure.

FIG. 5 is a schematic diagram of a partial structure of a phase shifter provided by an embodiment of the present disclosure, and FIG. 6 is a schematic diagram of a partial structure of another phase shifter provided by an embodiment of the present disclosure. As shown in FIGS. 5 and 6, optionally, in the transmission unit 20, it is also possible to introduce a conductor stub on only one side of the phase-shifter wiring 101 to increase the capacitive coupling area between the second wiring segment 202 and the grounding electrode layer 103, realize the slow-wave effect, achieve the same or larger phase change in a shorter physical length, significantly shorten the length of the phase-shifter wiring 101, reduce the loss of the radio frequency signal on the phase-shifter wiring 101, and improve the beam quality and radiation power of the antenna.

As shown in FIG. 5, the conductor stubs introduced in different transmission units 20 can all be located on the same side of the phase-shifter wiring 101. In this way, the transmission units 20 can be optimized through unified design parameters (such as length and width), ensuring the consistent performance of each of transmission units 20. As shown in FIG. 6, the conductor stubs introduced in adjacent transmission units 20 can also be located on different sides of the phase-shifter wiring 101. In this way, it is beneficial to making the electric field distribution more uniform and preventing the non-uniformity and reflection of the radio frequency signal during transmission, which is not specifically limited in the embodiments of the present disclosure.

It should be noted that in FIGS. 2, 5 and 6, the conductor stub is exemplified as being rectangular, but this is not a limitation. The shape of the conductor stub can be flexibly designed according to specific application demands and performance demands, for example a semi-circle, triangle, or trapezoid, as long as the capacitive coupling area between the second wiring segment 202 and the grounding electrode layer 103 is increased and the slow-wave effect is realized.

Continuing to refer to FIG. 2, optionally, along the first direction X, a length D1 of the first via-hole 30 is greater than or equal to the length D4 of the first wiring segment 201.

The inventors have found through research that in the direction perpendicular to the extension direction of the phase-shifter wiring 101 (i.e., the first direction X), the larger the length D1 of the first via-hole 30, the longer the actual path of the return current on the grounding electrode layer 103, and the larger the inductance value of the equivalent inductance of the defected ground structure formed by the first wiring segment 201 and the first via-hole 30; and at the same time, in the direction perpendicular to the extension direction of the phase-shifter wiring 101 (i.e., the first direction X), the smaller the length D4 of the first wiring segment 201, the larger the inductance value of the equivalent inductance of the defected ground structure formed by the first wiring segment 201 and the first via-hole 30.

In this embodiment, in the direction perpendicular to the extension direction of the phase-shifter wiring 101 (i.e., the first direction X), by setting the length D1 of the first via-hole 30 to be greater than or equal to the length D4 of the first wiring segment 201, a sufficiently large equivalent inductance can be introduced on the phase-shifter wiring 101, thereby helping to increase the distributed inductance on the phase-shifter wiring 101, reduce the phase velocity $v\phi$ and wavelength $\lambda$, realize the slow-wave effect, achieve the same or larger phase change in a shorter physical length, significantly shorten the length of the phase-shifter wiring 101, reduce the loss of the radio frequency signal on the phase-shifter wiring 101, and further improve the beam quality and radiation power of the antenna.

Continuing to refer to FIG. 2, optionally, along the direction perpendicular to the extension direction of the phase-shifter wiring 101 (i.e., the first direction X), the first via-hole 30 is symmetrically disposed with respect to the first wiring segment 201. In this way, the electric field and current can be more evenly distributed, which helps to reduce the non-uniformity and reflection of the radio frequency signal during transmission and improve the signal quality.

It should be noted that in the direction perpendicular to the extension direction of the phase-shifter wiring 101 (i.e., the first direction X), the specific values of the length D1 of the first via-hole 30 and the length D4 of the first wiring segment 201 can be set according to actual needs. For example, the length D1 of the first via-hole 30 can be set to about three times the length D4 of the first wiring segment 201, but this is not a limitation and is not specifically limited in the embodiments of the present disclosure.

Figure 7:
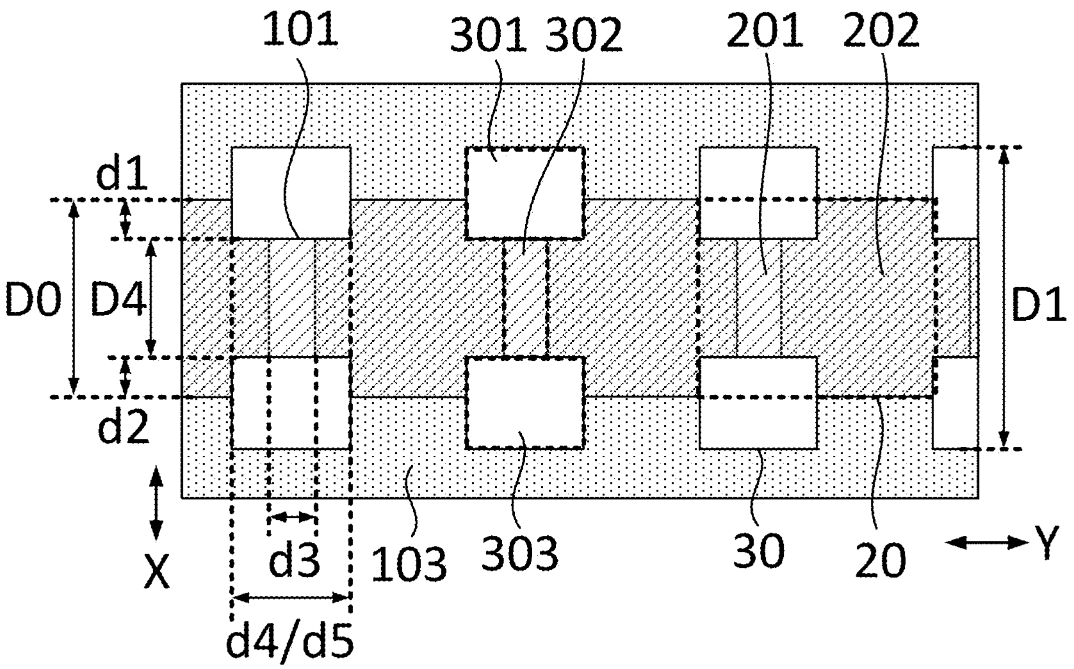
FIG. 7 is a schematic diagram of a partial structure of yet another phase shifter provided by an embodiment of the present disclosure.

FIG. 7 is a schematic diagram of a partial structure of yet another phase shifter provided by an embodiment of the present disclosure. As shown in FIG. 7, optionally, the first via-hole 30 includes a first via-hole subsection 301, a second via-hole subsection 302, and a third via-hole subsection 303 that are connected to each other. The first via-hole subsection 301, the second via-hole subsection 302, and the third via-hole subsection 303 are arranged in sequence in the first direction X. Along the direction perpendicular to the plane of the grounding electrode layer 103, the second via-hole subsection 302 overlaps with the first wiring segment 201. Along the extension direction of the phase-shifter wiring 101 (for example, the second direction Y), a length d3 of the second via-hole subsection 302 is less than a length d4 of the first via-hole subsection 301, and a length d3 of the second via-hole subsection 302 is less than a length d5 of the third via-hole subsection 303.

Specifically, as shown in FIG. 7, the first via-hole 30 can be divided into the first via-hole subsection 301, the second via-hole subsection 302, and the third via-hole subsection 303 that are connected to each other. Along the direction perpendicular to the plane of the grounding electrode layer 103, the part where the first via-hole 30 overlaps with the first wiring segment 201 is the second via-hole subsection 302. Along the direction perpendicular to the extension direction of the phase-shifter wiring 101 (i.e., the first direction X), the first via-hole subsection 301 and the third via-hole subsection 303 are respectively located on opposite sides of the second via-hole subsection 302.

The inventors have found through research that the defected ground structure formed by the first via-hole 30 and the first wiring segment 201 can form a low-pass filter, which has specific pass-band and stop-band characteristics, which may cause the phase shifter to have larger losses in certain frequency ranges, affecting the impedance matching and being not conducive to ensuring the transmission quality of the radio frequency signal.

In this embodiment, the shape of the first via-hole 30 is designed. Specifically, as shown in FIG. 7, along the extension direction of the phase-shifter wiring 101 (for example, the second direction Y), the length d4 of the first via-hole subsection 301 and the length d5 of the third via-hole subsection 303 are both set to be greater than the length d3 of the second via-hole subsection 302. In this case, the second via-hole subsection 302 is narrower, and the first via-hole subsection 301 and the third via-hole subsection 303 are both wider, so that the first via-hole 30 forms a dumbbell-like shape.

In this way, the overlapping area between the phase-shifter wiring 101 and the grounding electrode layer 103 can be increased in the defected ground structure part to introduce capacitance, so that the frequency response of the defected ground structure can be adjusted, making the frequency response of the defected ground structure more matched with the operating frequency of the phase shifter, which in turn helps to reduce losses, optimizes impedance matching, improve the transmission quality of the radio frequency signal, and is beneficial to expanding the bandwidth and improving the phase-shifting precision.

Optionally, along the extension direction of the phase-shifter wiring 101 (for example, the second direction Y), the length d3 of the second via-hole subsection 302 is greater than 0. To reduce the difficulty of the manufacturing process, the minimum value of the length d3 of the second via-hole subsection 302 can be determined by the process limit. For example, the length d3 of the second via-hole subsection 302 is greater than or equal to 10 μm, or greater than or equal to 4 μm, which is not specifically limited in the embodiments of the present disclosure.

In addition, the shapes of the first via-hole subsection 301 and the third via-hole subsection 303 can be flexibly designed according to specific application demands and performance demands, for example, a semi-circle, triangle, or trapezoid, as long as the capacitive coupling area between the second wiring segment 202 and the grounding electrode layer 103 can be increased and the slow-wave effect can be realized, which is not specifically limited in the embodiments of the present disclosure.

Figure 8:
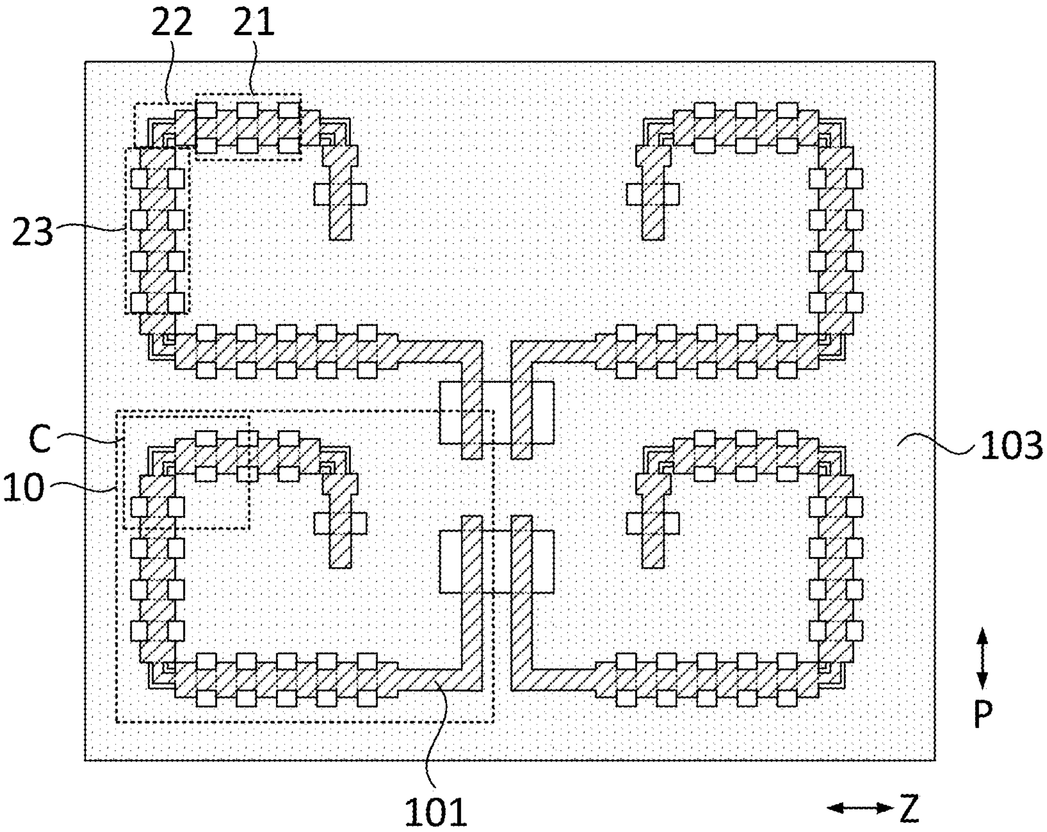
FIG. 8 is a structural schematic diagram of another phase shifter provided by an embodiment of the present disclosure.
Figure 9:
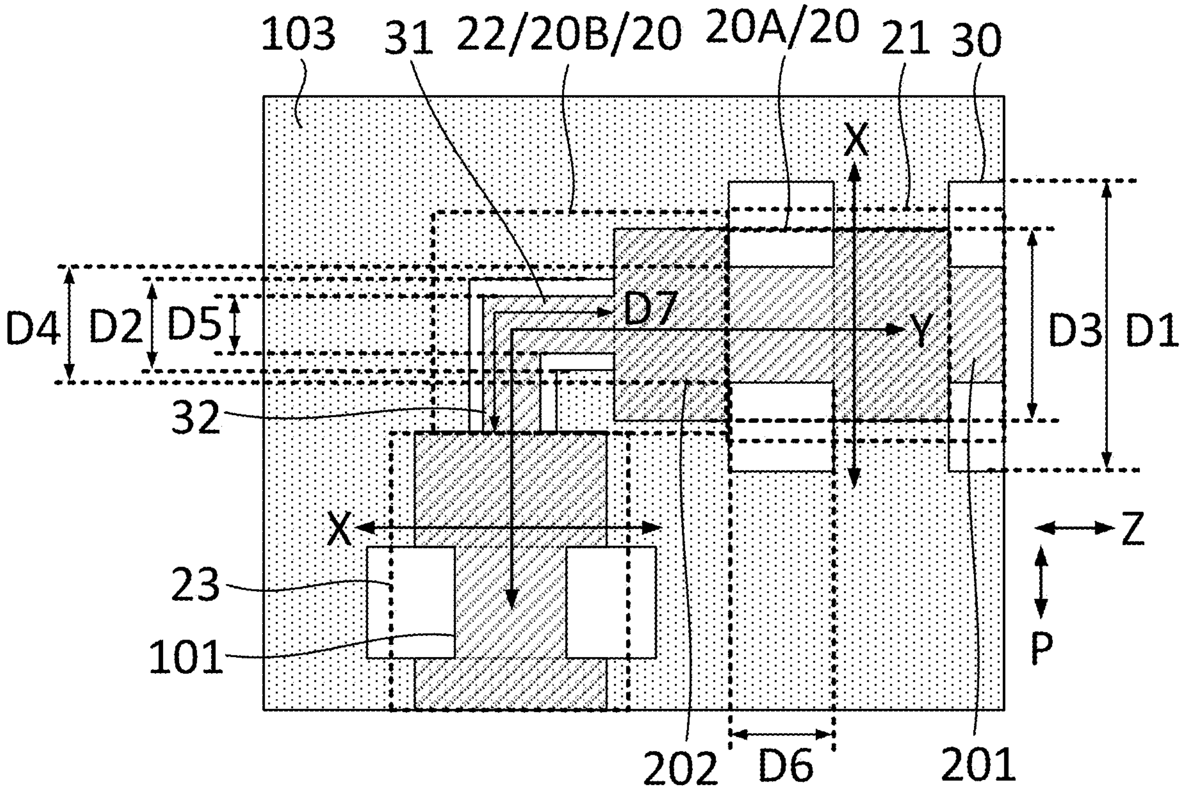
FIG. 9 is an enlarged structural schematic diagram of a part C in FIG. 8.

FIG. 8 is a structural schematic diagram of another phase shifter provided by an embodiment of the present disclosure, and FIG. 9 is an enlarged structural schematic diagram at C in FIG. 8. As shown in FIGS. 8 and 9, optionally, the phase-shifter wiring 101 includes a first wiring subsection 21, a second wiring subsection 22, and a third wiring subsection 23. The first wiring subsection 21 includes at least one transmission unit 20, and the transmission units 20 in the first wiring subsection 21 are connected in sequence along a third direction Z. The third wiring subsection 23 includes at least one transmission unit 20, and the transmission units 20 in the third wiring subsection 23 are connected in sequence along a fourth direction P. The third direction Z and the fourth direction P intersect. The second wiring subsection 22 is connected between the first wiring subsection 21 and the third wiring subsection 23, and the second wiring subsection 22 includes one transmission unit 20.

If the phase-shifter wiring 101 is designed as a straight line and only extends in the same direction, the phase-shifter wiring 101 may occupy a large space. To achieve a compact design, the phase-shifter wiring 101 easily forms an overlap with an adjacent phase-shifting unit 10, thereby causing crosstalk between adjacent phase-shifting units 10.

Based on the above technical problems, in this embodiment, as shown in FIGS. 8 and 9, the phase-shifter wiring 101 includes the first wiring subsection 21 extending along the third direction Z, the third wiring subsection 23 extending along the first wiring subsection 21, and the second wiring subsection 22 connected between the first wiring subsection 21 and the first wiring subsection 21. The third direction Z and the fourth direction P intersect to form a corner, so that the phase-shifter wiring 101 can be folded or looped in the phase-shifting unit 10. In this way, the phase-shifter wiring 101 can be flexibly arranged in a limited space, which helps to reduce the occupied space of the phase-shifter wiring 101 and improve the space utilization rate, and in turn in a compact design, the overlap between the phase-shifter wiring 101 and an adjacent phase-shifting unit 10 can be avoided, and the mutual crosstalk between adjacent phase-shifting units 10 can be reduced.

In the first wiring subsection 21, the transmission units 20 connected in series in the third direction Z are disposed to realize the slow-wave effect and achieve the same or larger phase change in a shorter physical length, so that the length of the first wiring subsection 21 can be significantly shortened, thereby reducing the length of the transmission path of the radio frequency signal on the first wiring subsection 21, and being beneficial to reducing the loss of the radio frequency signal on the phase-shifter wiring 101, and improving the beam quality and radiation power of the antenna.

Similarly, in the third wiring subsection 23, the transmission units 20 connected in series along the fourth direction P are disposed to realize the slow-wave effect and achieve the same or larger phase change in a shorter physical length, so that the length of the third wiring subsection 23 can be significantly shortened, thereby reducing the length of the transmission path of the radio frequency signal on the third wiring subsection 23, and being beneficial to reducing the loss of the radio frequency signal on the phase-shifter wiring 101, and improving the beam quality and radiation power of the antenna.

Further, the second wiring subsection 22 is used to transmit the radio frequency signal between the first wiring subsection 21 and the third wiring subsection 23. the transmission unit 20 is disposed in the second wiring subsection 22 to realize the slow-wave effect and achieve the same or larger phase change in a shorter physical length, so that the length of the second wiring subsection 22 can be significantly shortened, thereby reducing the length of the transmission path of the radio frequency signal on the second wiring subsection 22, and being beneficial to reducing the loss of the radio frequency signal on the phase-shifter wiring 101, and improving the beam quality and radiation power of the antenna.

At the same time, disposing transmission units 20 in the first wiring subsection 21, the second wiring subsection 22, and the third wiring subsection 23 is also beneficial to optimizing the impedance matching, ensuring the impedance matching of the wiring subsections, helping to reduce the reflection, and improving the transmission efficiency of the radio frequency signal.

It should be noted that the second wiring subsection 22 can include only one transmission unit 20 therein, so as to reduce the occupied space of the second wiring subsection 22, simplify the wiring design, and decrease the complexity of the second wiring subsection 22. However, this is not a limitation.

In other embodiments, more transmission units 20 can also be disposed in the second wiring subsection 22 to increase the length of the second wiring subsection 22, thereby being beneficial to expanding the spacing between the first wiring subsection 21 and the third wiring subsection 23, helping to avoid physical contact between the first wiring subsection 21 and the third wiring subsection 23, and reducing potential structural conflicts.

Continuing to refer to FIGS. 8 and 9, optionally, the transmission units 20 in the first wiring subsection 21 and the third wiring subsection 23 are first transmission units 20A, and the transmission unit 20 in the second wiring subsection 22 is a second transmission unit 20B. The first transmission unit 20A and the second transmission unit 20B have a same impedance.

When the impedance of different parts of the phase-shifter wiring 101 (such as the straight-line first wiring subsection 21 and third wiring subsection 23, and the corner-shaped second wiring subsection 22) is mismatched, a part of the radio frequency signal will be reflected, resulting in increased loss and affecting the transmission quality of the radio frequency signal.

In this embodiment, by setting the first transmission units 20A in the first wiring subsection 21 and the third wiring subsection 23 and the second transmission unit 20B in the second wiring subsection 22 to have the same impedance, good impedance matching can be maintained in different parts of the phase-shifter wiring 101, which reduces the reflection and loss of the radio frequency signal and improves the transmission efficiency of the radio frequency signal.

It can be understood that, to achieve a uniform impedance distribution on the phase-shifter wiring 101, all the first transmission units 20A in the first wiring subsection 21 can have the same impedance, all the first transmission units 20A in the third wiring subsection 23 can have the same impedance, and all the second transmission unit 20B in the second wiring subsection 22 can have the same impedance.

Figure 10:
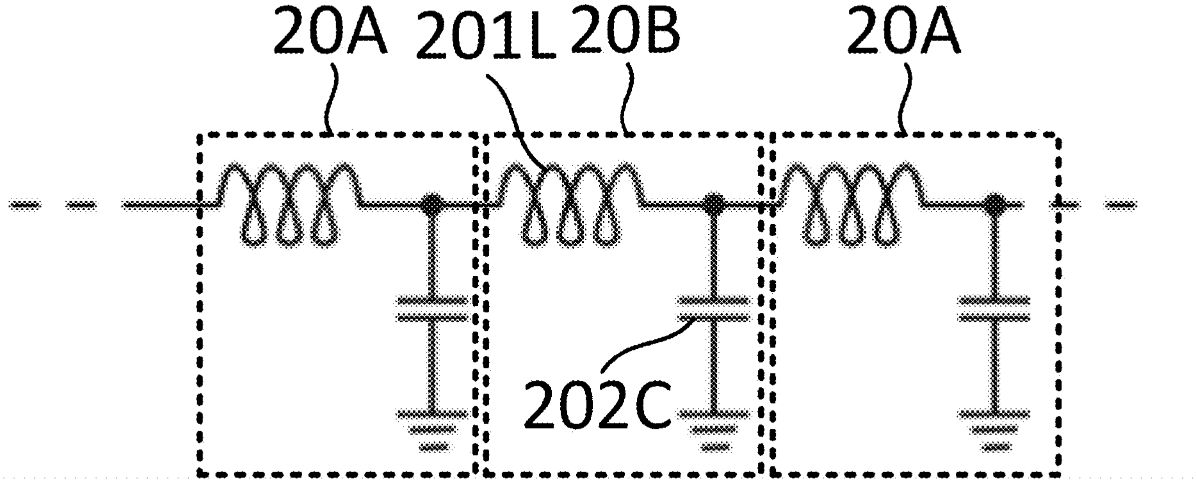
FIG. 10 is a schematic diagram of an equivalent circuit of another transmission unit provided by an embodiment of the present disclosure.

FIG. 10 is a schematic diagram of an equivalent circuit of another transmission unit provided by an embodiment of the present disclosure. As shown in FIGS. 8-10, optionally, the first wiring segment 201 and the first via-hole 30 form an equivalent inductance 201L. The second wiring segment 202 and the grounding electrode layer 103 disposed opposite thereto form an equivalent capacitance 202C. In each of the first transmission units 20A, an inductance value of the equivalent inductance 201L is L1, and a capacitance value of the equivalent capacitance 202C is C1. In the second transmission unit 20B, the inductance value of the equivalent inductance 201L is L2, and the capacitance value of the equivalent capacitance 202C is C2, where L1/C1=L2/C2.

Specifically, as mentioned above, the first via-hole 30 and the first wiring segment 201 form a defected ground structure (DGS), and the defected ground structure can be equivalent to an inductive element, that is, the equivalent inductance 201L. At the same time, the second wiring segment 202 and the grounding electrode layer 103 disposed opposite thereto can be equivalent to a parallel-plate capacitor, that is, the equivalent capacitance 202C.

Further, the impedance Zc satisfies the formula $$Zc = \sqrt{\frac{L}{C}};$$

where L is the distributed inductance, which refers to the inductance value per unit length.

C is the distributed capacitance, which refers to the capacitance value per unit length.

Therefore, in this embodiment, by setting the ratio L1/C1 between the inductance value L1 of the equivalent inductance 201L and the capacitance value C1 of the equivalent capacitance 202C in the first transmission unit 20A to be equal to the ratio L2/C2 between the inductance value L2 of the equivalent inductance 201L and the capacitance value C2 of the equivalent capacitance 202C in the second transmission unit 20B, the first transmission unit 20A and the second transmission unit 20B are made to have the same impedance, thereby maintaining good impedance matching in different parts of the phase-shifter wiring 101 (for example, the first wiring subsection 21, the second wiring subsection 22, and the third wiring subsection 23), reducing the reflection and loss of the radio frequency signal and improving the transmission efficiency of the radio frequency signal.

It should be noted that the inductance value of the equivalent inductance 201L of the defected ground structure formed by the first via-hole 30 and the first wiring segment 201 depends on its geometric parameters, for example, the size of the first via-hole 30 and the size of the first wiring segment 201.

Modeling and simulation can be carried out through the electromagnetic simulation tool to calculate the inductance value of the equivalent inductance 201L of the defected ground structure. The simulation tool can accurately calculate the inductance effect of the defected ground structure according to specific geometric parameters and material properties.

In some embodiments, an estimation can also be performed by using empirical formulas. For example, for the defected ground structure with a simple circular first via-hole 30, the inductance value L01 of the equivalent inductance 201L can be approximately expressed as:

$$L01 \approx \mu_0 \times \frac{\ln\left(\frac{2h_1}{d_1}\right)}{2\pi};$$

where $\mu_0$ is the vacuum permeability, $h_1$ is the height of the first via-hole 30, and $d_1$ is the diameter of the first via-hole 30.

In addition, the first wiring segment 201 itself may also generate a certain inductance effect, and its inductance value can depend on the geometric parameters (for example, length, width, and thickness) of the first wiring segment 201.

Therefore, the inductance value of the first wiring segment 201 can be estimated through its geometric parameters. For example, for a simple microstrip line or coplanar waveguide, the inductance value L02 of the first wiring segment 201 can be calculated by using the inductance formula:

$$L02 \approx \frac{\mu_0 \times l}{2\pi} \times \ln\left(\frac{2h_2}{w}\right)$$

where l is the length of the first wiring segment 201, w is the line width of the first wiring segment 201, and $h_2$ is the distance between the first wiring segment 201 and the grounding electrode layer 103.

It can be understood that those of skill in the art can design the size of the first via-hole 30 and the size of the first wiring segment 201 to achieve the desired inductance value of the equivalent inductance 201L. For example, a larger size of the first via-hole 30 and a smaller line width of the first wiring segment 201 can increase the inductance value of the equivalent inductance 201L, which is not limited in the embodiments of the present disclosure.

Similarly, the capacitance value of the equivalent capacitance 202C formed by the second wiring segment 202 and the grounding electrode layer 103 disposed opposite thereto can also be calculated through modeling and simulation by using the electromagnetic simulation tool.

In some embodiments, an estimation can also be performed by using empirical formulas. For example, for a simple parallel-plate capacitor, the capacitance value C01 of the equivalent capacitance 202C can be expressed as:

$$C01 = \epsilon_r \times \epsilon_0 \times \frac{A}{d_2};$$

where $\varepsilon_r$ is the relative permittivity of the medium, $\varepsilon_0$ is the vacuum permittivity, A is the overlapping area of the second wiring segment 202 and the grounding electrode layer 103 disposed opposite thereto, and $d_2$ is the distance between the second wiring segment 202 and the grounding electrode layer 103 disposed opposite thereto.

In addition, the first wiring segment 201 itself may also generate a certain inductance effect, and its inductance value can depend on the geometric parameters of the first wiring segment 201 (for example, length, width, and thickness).

It can be understood that those of skill in the art can design the size of the second wiring segment 202 to achieve the desired capacitance value of the equivalent capacitance 202C. For example, increasing the overlapping area between the second wiring segment 202 and the grounding electrode layer 103 disposed opposite thereto and reducing the distance between the second wiring segment 202 and the grounding electrode layer 103 disposed opposite thereto can increase the capacitance value of the equivalent capacitance 202C, which is not limited in the embodiments of the present disclosure.

Optionally, L1=L2, and C1=C2.

Specifically, as mentioned above, the impedance Zc satisfies the formula $$Zc = \sqrt{\frac{L}{C}}.$$

Therefore, in this embodiment, by setting the inductance value L1 of the equivalent inductance 201L in the first transmission unit 20A to be equal to the inductance value L2 of the equivalent inductance 201L in the second transmission unit 20B, and the capacitance value C1 of the equivalent capacitance 202C in the first transmission unit 20A to be equal to the capacitance value C2 of the equivalent capacitance 202C in the second transmission unit 20B, the first transmission unit 20A and the second transmission unit 20B are made to have the same impedance, thereby maintaining good impedance matching in different parts of the phase-shifter wiring 101 (for example, the first wiring subsection 21, the second wiring subsection 22, and the third wiring subsection 23), reducing the reflection and loss of the radio frequency signal, and improving the transmission efficiency of the radio frequency signal.

Further, as mentioned above, the inductance value of the equivalent inductance 201L of the defected ground structure formed by the first via-hole 30 and the first wiring segment 201 depends on its geometric parameters. Therefore, by setting the geometric parameters of the defected ground structures in the first transmission unit 20A and the second transmission unit 20B to be the same, the inductance value L1 of the equivalent inductance 201L in the first transmission unit 20A can be made equal to the inductance value L2 of the equivalent inductance 201L in the second transmission unit 20B.

For example, in the first transmission unit 20A and the second transmission unit 20B, the first via-holes 30 have the same size and the first wiring segments 201 have the same size, so as to make the inductance value L1 of the equivalent inductance 201L in the first transmission unit 20A equal to the inductance value L2 of the equivalent inductance 201L in the second transmission unit 20B, but this is not a limitation.

Similarly, the capacitance value of the equivalent capacitance 202C formed by the second wiring segment 202 and the grounding electrode layer 103 disposed opposite thereto also depends on its geometric parameters. Therefore, by setting the geometric parameters of the defected ground structures of the first transmission unit 20A and the second transmission unit 20B to be the same, the capacitance value C1 of the equivalent capacitance 202C in the first transmission unit 20A can be made equal to the capacitance value C2 of the equivalent capacitance 202C in the second transmission unit 20B.

For example, in the first transmission unit 20A and the second transmission unit 20B, the overlapping area between the second wiring segment 202 and the grounding electrode layer 103 disposed opposite thereto is the same and the distance between the second wiring segment 202 and the grounding electrode layer 103 disposed opposite thereto is the same, so as to make the capacitance value C1 of the equivalent capacitance 202C in the first transmission unit 20A equal to the capacitance value C2 of the equivalent capacitance 202C in the second transmission unit 20B, but it is not limited to this.

It should be noted that the impedance in the embodiments of the present disclosure refers to the characteristic impedance. The characteristic impedance refers to the impedance per unit length of the phase-shifter wiring 101 when an radio frequency signal propagates on the phase-shifter wiring 101.

In this embodiment, the characteristic impedance can be set to 50 ohms. 50 ohms can achieve a better balance between an air-based medium (such as free space) and a typical printed circuit board (PCB) material, provide sufficient bandwidth and maintain low losses, but this is not a limitation and not limited in the embodiments of the present disclosure.

Further, in the transmission unit 20, the inductance value of the equivalent inductance 201L of the defected ground structure formed by the first via-hole 30 and the first wiring segment 201, and the capacitance value of the equivalent capacitance 202C formed by the second wiring segment 202 and the grounding electrode layer 103 disposed opposite thereto can be set according to the characteristic impedance.

In the transmission unit 20, the inductance value of the equivalent inductance 201L of the defected ground structure formed by the first via-hole 30 and the first wiring segment 201 can be on the order of nanohenries (for example, between a few nanohenries and a few tens of nanohenries), and the capacitance value of the equivalent capacitance 202C formed by the second wiring segment 202 and the grounding electrode layer 103 disposed opposite thereto can be on the order of picofarads (pF), such as between a few picofarads and a few tens of picofarads, which is not specifically limited in the embodiments of the present disclosure.

Further, in the transmission unit 20, the size of the defected ground structure formed by the first via-hole 30 and the first wiring segment 201, and the sizes of the second wiring segment 202 and the grounding electrode layer 103 disposed opposite thereto can be set according to the demands for the inductance value of the equivalent inductance 201L and the capacitance value of the equivalent capacitance 202C.

For example, in the transmission unit 20, along the extension direction of the phase-shifter wiring 101 (i.e., the transmission direction of the radio frequency signal on the phase-shifter wiring 101), the length of the first wiring segment 201 in the transmission unit 20 can be set to about a few hundred micrometers, and the length of the second wiring segment 202 in the transmission unit 20 can be set to about a few hundred micrometers. Then, the length of the phase-shifter wiring 101 in the transmission unit 20 can also be set to about a few hundred micrometers to achieve better antenna performance in high-frequency applications, but this is not a limitation.

Continuing to refer to FIG. 9, optionally, the transmission units 20 in the first wiring subsection 21 and the third wiring subsection 23 are first transmission units 20A, and the transmission unit 20 in the second wiring subsection 22 is a second transmission unit 20B. An electrical length of each of the first transmission units 20A is equal to an electrical length of the second transmission unit 20B.

The specific structural settings of the first transmission unit 20A and the second transmission unit 20B can refer to any of the above-mentioned embodiments, and will not be repeated here.

Further, the electrical length refers to the ratio between the distance that the radio frequency signal propagates in the phase-shifter wiring 101 and its wavelength. The electrical length can be expressed as a multiple of the wavelength, for example, $\lambda/4$ or $\lambda/2$.

In some embodiments, by setting the first transmission units 20A in the first wiring subsection 21 and the third wiring subsection 23 and the second transmission unit 20B in the second wiring subsection 22 to have equal electrical lengths, it can be ensured that the phase velocity and wavelength of the radio frequency signal propagating in the first transmission unit 20A and the second transmission unit 20B are the same. Thus, the phase change of the radio frequency signal in different wiring subsections can be made consistent, avoiding phase offset and discontinuity, and being beneficial to improving the phase control accuracy.

The electrical length can depend on the physical length of the phase-shifter wiring 101 in the transmission unit 20. Therefore, by adjusting the physical length of the phase-shifter wiring 101 in the transmission unit 20, the physical lengths of the phase-shifter wirings 101 in the first transmission unit 20A and the second transmission unit 20B can be made equal or close, so as to make the electrical length of the first transmission unit 20A equal to the electrical length of the second transmission unit 20B.

In some embodiments, along the extension direction of the phase-shifter wiring 101 (i.e., the transmission direction of the radio frequency signal on the phase-shifter wiring 101), the length of the phase-shifter wiring 101 in the transmission unit 20 can be set to about a few hundred micrometers, but this is not a limitation.

Further, the electrical length is also related to parameters such as the characteristic impedance and dielectric constant of the phase-shifter wiring 101. Therefore, by adjusting the size of the first via-hole 30 and the size of the first wiring segment 201 in the transmission unit 20, the inductance effect of the defected ground structure formed by the first via-hole 30 and the first wiring segment 201 can be changed, so as to make the electrical length of the first transmission unit 20A equal to the electrical length of the second transmission unit 20B.

In some embodiments, by adjusting the overlapping area between the second wiring segment 202 and the grounding electrode layer 103 disposed opposite thereto in the transmission unit 20, and the spacing between the second wiring segment 202 and the grounding electrode layer 103 disposed opposite thereto, the equivalent capacitance 202C in the transmission unit 20 can be changed, so as to make the electrical length of the first transmission unit 20A equal to the electrical length of the second transmission unit 20B, but this is not a limitation and is not specifically limited in the embodiments of the present disclosure.

Continuing to refer to FIG. 9, optionally, the transmission units 20 in the first wiring subsection 21 and the third wiring subsection 23 are the first transmission units 20A, and the transmission unit 20 in the second wiring subsection 22 is a second transmission unit 20B. In each of the first transmission units 20A, along the first direction X, a length of the first via-hole 30 is D1; in the second transmission unit 20B, along the first direction X, the length of the first via-hole 30 is D2, and D2<D1.

The specific structural settings of the first transmission unit 20A and the second transmission unit 20B can refer to any of the above-mentioned embodiments, and will not be repeated here.

In some embodiments, as shown in FIG. 9, along the direction perpendicular to the extension direction of the phase-shifter wiring 101 (for example, the second direction Y), or along the direction perpendicular to the transmission direction of the radio frequency signal on the phase-shifter wiring 101 (for example, the second direction Y) (i.e., the first direction X), the length D2 of the first via-hole 30 in the second transmission unit 20B is less than the length D1 of the first via-hole 30 in the first transmission unit 20A. In this way, the size of the first via-hole 30 in the second transmission unit 20B at the corner of the phase-shifter wiring 101 can be reduced to reduce the space occupation of the phase-shifter wiring 101 at the corner and achieve a compact design.

The specific values of the length D2 of the first via-hole 30 in the second transmission unit 20B and the length D1 of the first via-hole 30 in the first transmission unit 20A can be set according to actual needs, and are not limited specifically the embodiments of the present disclosure.

Continuing to refer to FIG. 9, optionally, the transmission unit 20 in the second wiring subsection 22 is a second transmission unit 20B. In the second transmission unit 20B, along the first direction X, a length of the first via-hole 30 is D2, and the length of the second wiring segment 202 is D3, where D2≤D3.

The specific structural setting of the second transmission unit 20B can refer to any of the above-mentioned embodiments, and will not be repeated here.

In some embodiments, as shown in FIG. 9, along the direction perpendicular to the extension direction of the phase-shifter wiring 101 (e.g., the second direction Y), or along the direction perpendicular to the transmission direction of the radio frequency signal on the phase-shifter wiring 101 (e.g., the second direction Y) (i.e., the first direction X), the length D2 of the first via-hole 30 in the second transmission unit 20B is set to be less than or equal to the length D3 of the second wiring segment 202. In this way, the size of the first via-hole 30 in the second transmission unit 20B at the corner of the phase-shifter wiring 101 can be reduced, so as to reduce the space occupation of the phase-shifter wiring 101 at the corner and achieve a compact design.

The specific values of the length D2 of the first via-hole 30 and the length D3 of the second wiring segment 202 in the second transmission unit 20B can be set according to actual needs, and are not limited in the embodiments of the present disclosure.

Continuing to refer to FIG. 9, optionally, the transmission units 20 in the first wiring subsection 21 and the third wiring subsection 23 are the first transmission units 20A, and the transmission unit 20 in the second wiring subsection 22 is a second transmission unit 20B. In each of the first transmission unit 20A, along the first direction X, the length of the first wiring segment 201 is D4. In the second transmission unit 20B, along the first direction X, the length of the first wiring segment 201 is D5, where D5<D4.

The specific structural settings of the first transmission unit 20A and the second transmission unit 20B can refer to any of the above-mentioned embodiments, and will not be repeated here.

It can be understood that, to reduce the space occupation of the phase-shifter wiring 101 at the corner, the length D2 of the first via-hole 30 in the second transmission unit 20B at the corner of the phase-shifter wiring 101 can be reduced. In this way, the inductance value L2 of the equivalent inductance 201L in the second transmission unit 20B may be decreased.

In some embodiments, as shown in FIG. 9, along the direction perpendicular to the extension direction of the phase-shifter wiring 101 (e.g., the second direction Y), or along the direction perpendicular to the transmission direction of the radio frequency signal on the phase-shifter wiring 101 (for example, the second direction Y) (i.e., the first direction X), setting the length D5 of the first wiring segment 201 in the second transmission unit 20B to be less than the length D4 of the first wiring segment 201 in the first transmission unit 20A can reduce the line-width of the first wiring segment 201 in the second transmission unit 20B. In this way, the inductance value L2 of the equivalent inductance 201L in the second transmission unit 20B can be increased, thereby compensating for the decrease in inductance caused by the reduction of the length D2 of the first via-hole 30 in the second transmission unit 20B, and in turn ensuring that the first transmission unit 20A and the second transmission unit 20B have the same impedance, maintaining good impedance matching, reducing the reflection and loss of the radio frequency signal, and improving the transmission efficiency of the radio frequency signal.

The specific values of the length D5 of the first wiring segment 201 in the second transmission unit 20B and the length D4 of the first wiring segment 201 in the first transmission unit 20A can be set according to actual needs, and are not limited in the embodiments of the present disclosure.

Continuing to refer to FIG. 9, optionally, the transmission units 20 in the first wiring subsection 21 and the third wiring subsection 23 are the first transmission units 20A, and the transmission unit 20 in the second wiring subsection 22 is a second transmission unit 20B. In the first transmission unit 20A, along the extension direction of the phase-shifter wiring 101, the length of the first wiring segment 201 is D6. In the second transmission unit 20B, along the extension direction of the phase-shifter wiring 101, the length of the first wiring segment 201 is D7, where D7>D6.

The specific structural settings of the first transmission unit 20A and the second transmission unit 20B can refer to any of the above-mentioned embodiments, and will not be repeated here.

As mentioned above, to reduce the space occupation of the phase-shifter wiring 101 at the corner, the length D2 of the first via-hole 30 in the second transmission unit 20B at the corner of the phase-shifter wiring 101 can be reduced. In this way, the inductance value L2 of the equivalent inductance 201L in the second transmission unit 20B can be decreased.

In some embodiments, as shown in FIG. 9, along the extension direction of the phase-shifter wiring 101 (e.g., the second direction Y), or along the transmission direction of the radio frequency signal on the phase-shifter wiring 101 (e.g., the second direction Y), the length D7 of the first wiring segment 201 in the second transmission unit 20B is set to be greater than the length D6 of the first wiring segment 201 in the first transmission unit 20A to increase the length of the first wiring segment 201 in the second transmission unit 20B. In this way, the inductance value L2 of the equivalent inductance 201L in the second transmission unit 20B can be increased, thereby compensating for the decrease in inductance caused by the reduction of the length D2 of the first via-hole 30 in the second transmission unit 20B, and in turn ensuing that the first transmission unit 20A and the second transmission unit 20B have the same impedance, maintaining good impedance matching, reducing the reflection and loss of the radio frequency signal, and improving the transmission efficiency of the radio frequency signal.

At the same time, increasing the length of the first wiring segment 201 in the second transmission unit 20B is also beneficial for expanding the spacing between the first wiring subsection 21 and the third wiring subsection 23, helps to avoid physical contact between the first wiring subsection 21 and the third wiring subsection 23 and reduce potential structural conflicts.

The specific values of the length D7 of the first wiring segment 201 in the second transmission unit 20B and the length D6 of the first wiring segment 201 in the first transmission unit 20A can be set according to actual needs, and are not limited specifically in the embodiments of the present disclosure.

Continuing to refer to FIG. 9, optionally, the transmission unit 20 in the second wiring subsection 22 is a second transmission unit 20B. In the second transmission unit 20B, the first wiring segment 201 includes a first sub-segment 31 and a second sub-segment 32 that are connected to each other. The first sub-segment 31 extends along the third direction Z, and the second sub-segment 32 extends along the fourth direction P.

The specific structural setting of the second transmission unit 20B can refer to any of the above-mentioned embodiments, and will not be repeated here.

In this embodiment, as shown in FIG. 9, the first wiring segment 201 in the second transmission unit 20B includes the first sub-segment 31 extending along the third direction Z and the second sub-segment 32 extending along the fourth direction P, and the first sub-segment 31 and the second sub-segment 32 introduce a corner on the first wiring segment 201, enabling the second transmission unit 20B to be connected between the first wiring subsection 21 and the third wiring subsection 23 to form a continuous transmission path.

In some embodiments, as shown in FIG. 9, the third direction Z and the fourth direction P are perpendicular to each other. In this case, a 90-degree corner is formed on the first wiring segment 201 in the second transmission unit 20B, which is beneficial for reducing the space occupation of the phase-shifter wiring 101 and achieving a compact and miniaturized design.

In other embodiments, another angle can also be formed between the third direction Z and the fourth direction P, for example, 45 degree or 60 degree. Thus, the most suitable turning angle can be flexibly selected according to the actual space limitations and layout requirements to achieve the best performance and space utilization.

Figure 11:
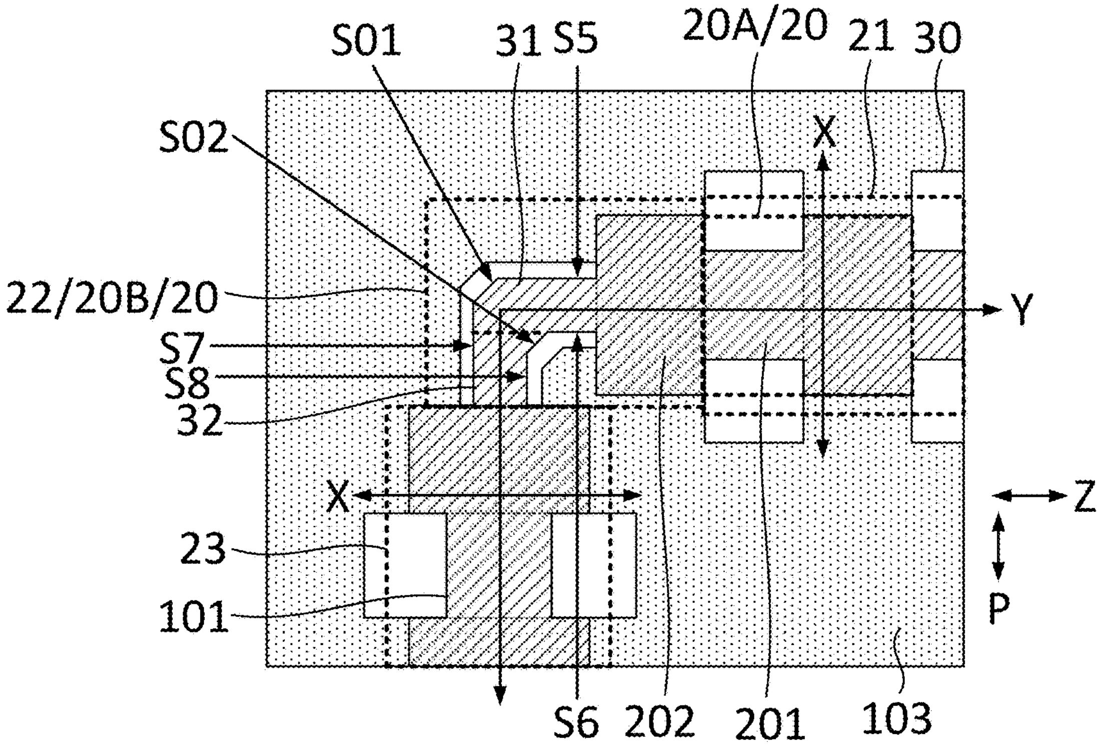
FIG. 11 is a schematic diagram of a partial structure of yet another phase shifter provided by an embodiment of the present disclosure.

FIG. 11 is a schematic diagram of a partial structure of yet another phase shifter provided by an embodiment of the present disclosure. As shown in FIG. 11, optionally, in the second transmission unit 20B, along the first direction X, the first sub-segment 31 includes a fifth boundary S5 and a sixth boundary S6 that are disposed opposite to each other, and the second sub-segment 32 includes a seventh boundary S7 and an eighth boundary S8 that are disposed opposite to each other. In the second transmission unit 20B, the first wiring segment 201 further includes a first chamfered boundary S01 and a second chamfered boundary S02. The first chamfered boundary S01 is connected between the fifth boundary S5 and the seventh boundary S7, and the angle between the first chamfered boundary S01 and the fifth boundary S5 is an obtuse angle, and the angle between the first chamfered boundary S01 and the seventh boundary S7 is an obtuse angle. The second chamfered boundary S02 is connected between the sixth boundary S6 and the eighth boundary S8, and the angle between the second chamfered boundary S02 and the sixth boundary S6 is an obtuse angle, and the angle between the second chamfered boundary S02 and the eighth boundary S8 is an obtuse angle.

Specifically, as shown in FIG. 11, in the first wiring segment 201 of the second transmission unit 20B, the fifth boundary S5 and the sixth boundary S6 of the first sub-segment 31 can be arranged along the fourth direction P and extend along the third direction Z. The seventh boundary S7 and the eighth boundary S8 of the second sub-segment 32 can be arranged along the third direction Z and extend along the fourth direction P.

In the first wiring segment 201 of the second transmission unit 20B, the fifth boundary S5 of the first sub-segment 31 and the seventh boundary S7 of the second sub-segment 32 are connected by the first chamfered boundary S01. The angle between the first chamfered boundary S01 and the fifth boundary S5 is greater than 90°, and the angle between the first chamfered boundary S01 and the seventh boundary S7 is greater than 90°, so that the fifth boundary S5 and the seventh boundary S7 are connected by a chamfer. In this way, the edge of the first sub-segment 31 between the fifth boundary S5 and the seventh boundary S7 is relatively smooth, avoiding the concentration of the electric field at this position, thereby reducing the concentration of the local field strength, which is beneficial for reducing unnecessary radiation and loss.

Further, the first chamfered boundary S01 can be a straight line, which is simple in design and easy to implement. In other embodiments, the first chamfered boundary S01 can also be a curve, which can provide a smoother transition between the fifth boundary S5 and the seventh boundary S7, reduce the concentration of the electric field, and further reduce unnecessary radiation and loss. This is not specifically limited in the embodiments of the present disclosure.

Continuing to refer to FIG. 11, optionally, setting the length of the first chamfered boundary S01 in the first direction X to be less than or equal to half of the length of the first sub-segment 31 in the first direction X can ensure the electrical connection performance between the first sub-segment 31 and the second sub-segment 32.

Similarly, as shown in FIG. 11, in the first wiring segment 201 of the second transmission unit 20B, the sixth boundary S6 of the first sub-segment 31 and the eighth boundary S8 of the second sub-segment 32 are connected by the second chamfered boundary S02. The angle between the second chamfered boundary S02 and the sixth boundary S6 is greater than 90°, and the angle between the second chamfered boundary S02 and the eighth boundary S8 is greater than 90°, so that the sixth boundary S6 and the eighth boundary S8 are connected by a chamfer. In this way, the edge of the first sub-segment 31 between the sixth boundary S6 and the eighth boundary S8 is relatively smooth, avoiding the concentration of the electric field at this position, thereby reducing the concentration of the local field strength, which is beneficial for reducing unnecessary radiation and loss.

Further, the second chamfered boundary S02 can be a straight line, which is simple in design and easy to implement. In other embodiments, the second chamfered boundary S02 can also be a curve, which can provide a smoother transition between the sixth boundary S6 and the eighth boundary S8, reduce the concentration of the electric field, and further reduce unnecessary radiation and loss. This is not specifically limited in the embodiments of the present disclosure.

Continuing to refer to FIG. 11, optionally, setting the length of the second chamfered boundary S02 in the first direction X to be less than or equal to half of the length of the first sub-segment 31 in the first direction X can ensure the electrical connection performance between the first sub-segment 31 and the second sub-segment 32.

Figure 12:
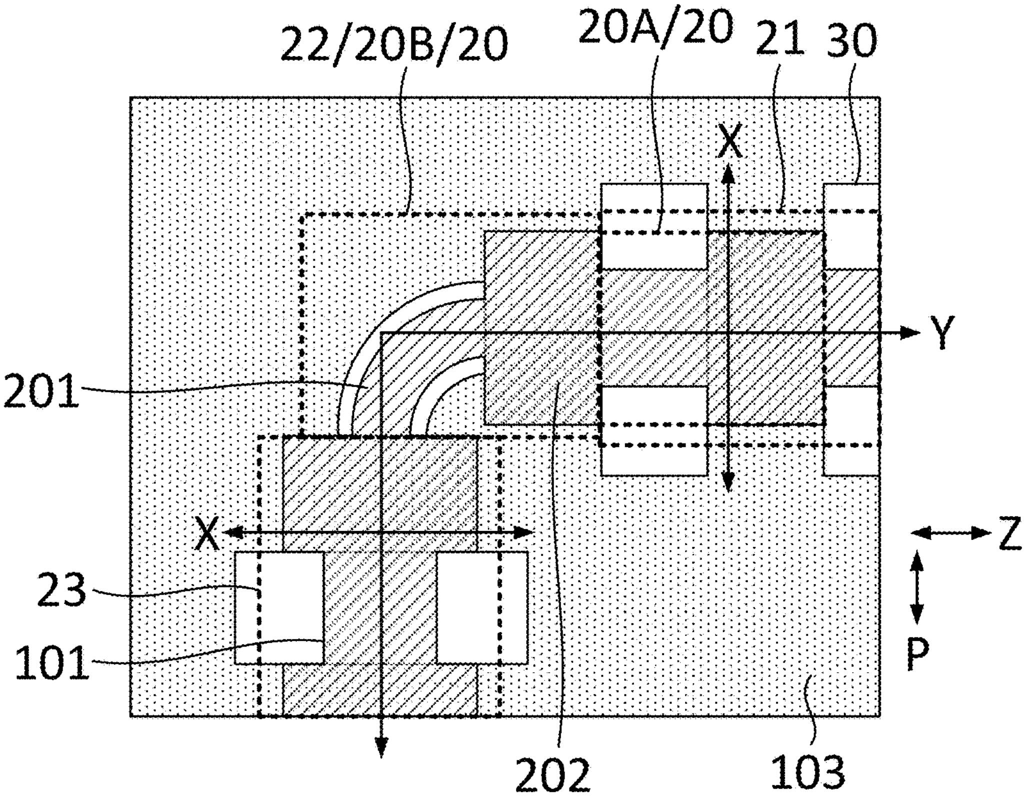
FIG. 12 is a schematic diagram of a partial structure of yet another phase shifter provided by an embodiment of the present disclosure.

FIG. 12 is a schematic diagram of a partial structure of yet another phase shifter provided by an embodiment of the present disclosure. As shown in FIG. 12, optionally, the transmission unit 20 in the second wiring subsection 22 is a second transmission unit 20B. In the second transmission unit 20B, the first wiring segment 201 is an arc.

The specific structural setting of the second transmission unit 20B can refer to any of the above-mentioned embodiments, and will not be repeated here.

In this embodiment, as shown in FIG. 12, in the second transmission unit 20B, setting the first wiring segment 201 as an arc can achieve a smoother electromagnetic field distribution at the corner, reduce the concentration of the local field strength, and further reduce unnecessary radiation and loss.

Figure 13:
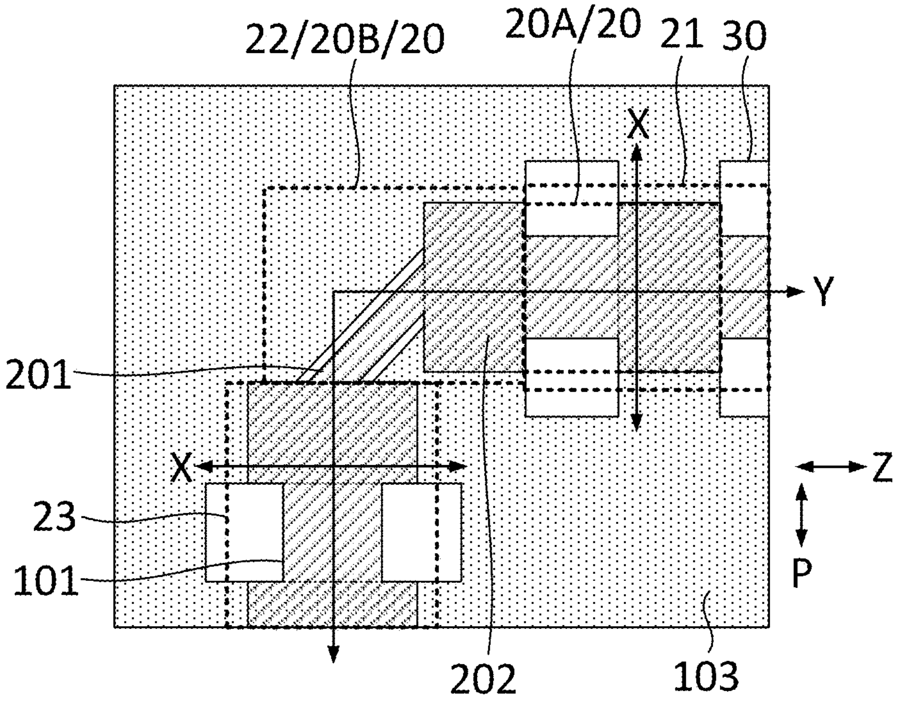
FIG. 13 is a schematic diagram of a partial structure of yet another phase shifter provided by an embodiment of the present disclosure.

FIG. 13 is a schematic diagram of a partial structure of yet another phase shifter provided by an embodiment of the present disclosure. As shown in FIG. 13, optionally, the transmission unit 20 in the second wiring subsection 22 is a second transmission unit 20B. In the second transmission unit 20B, the first wiring segment 201 is a straight line.

The specific structural setting of the second transmission unit 20B can refer to any of the above-mentioned embodiments, and will not be repeated here.

In this embodiment, as shown in FIG. 13, in the second transmission unit 20B, the first wiring segment 201 is set as a straight line, and the extension direction of the first wiring segment 201 in the second transmission unit 20B intersects with the third direction Z and also intersects with the fourth direction P, enabling the second transmission unit 20B to be connected between the first wiring subsection 21 and the third wiring subsection 23 to form a continuous transmission path.

At the same time, in the second transmission unit 20B, setting the first wiring segment 201 as a straight line can also achieve a smoother electromagnetic field distribution, reduce the concentration of the local field strength, and further reduce unnecessary radiation and loss. Continuing to refer to FIG. 8, optionally, the phase-shifter wiring 101 is formed into a spiral structure to reduce the occupied space of the phase-shifter wiring 101 and improve the space utilization. In turn, in a compact design, the overlap between a phase-shifter wiring 101 and the adjacent phase-shifting unit 10 can be avoided, and the mutual crosstalk between adjacent phase-shifting units 10 can be reduced.

In other embodiments, the phase-shifter wiring 101 can also be formed into other shapes to make full use of the phase shifter space, for example, a U-shape, a W-shape, or a serpentine shape, which is not limited in the embodiments of the present disclosure.

Based on the same inventive concept, an embodiment of the present disclosure further provides an antenna. The antenna includes the phase shifter as described in any of the embodiments of the present disclosure. Therefore, the antenna provided by the embodiment of the present disclosure has the technical effects of the technical solutions in any of the above-mentioned embodiments. The explanations of the structures and terms that are the same as or corresponding to those in the above-mentioned embodiments will not be repeated here.

Figure 14:
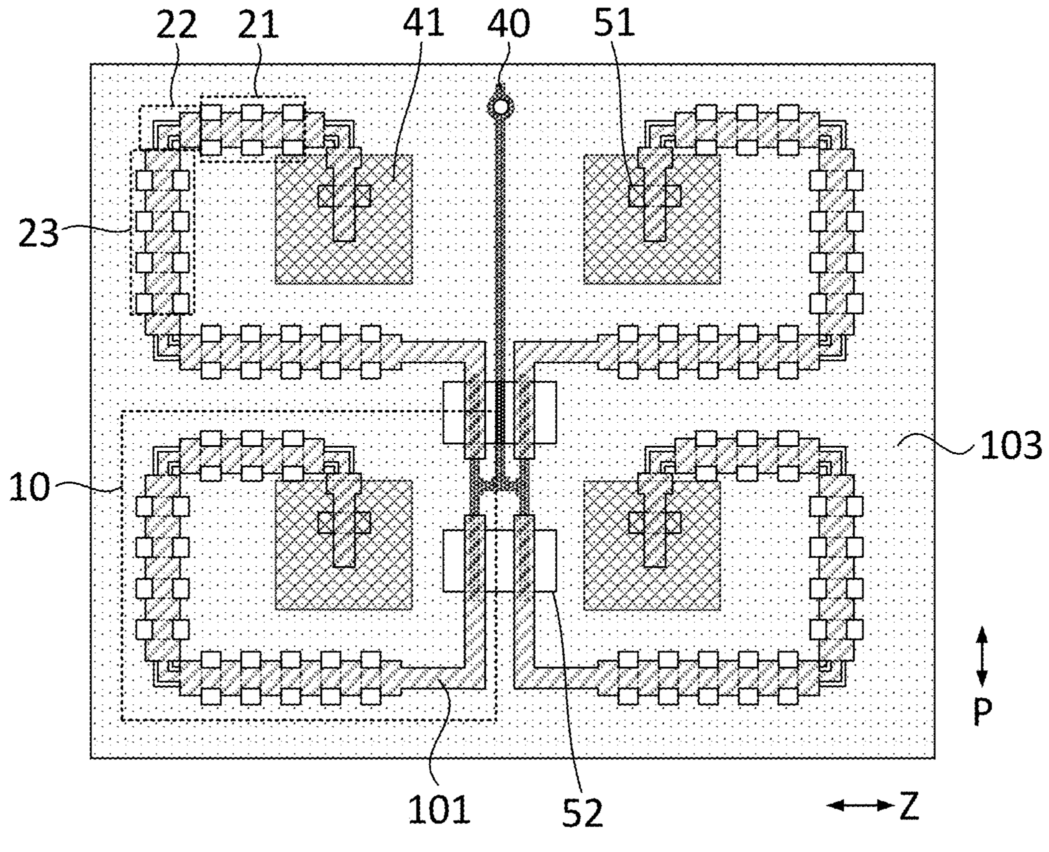
FIG. 14 is a structural schematic diagram of an antenna provided by an embodiment of the present disclosure.
Figure 15:
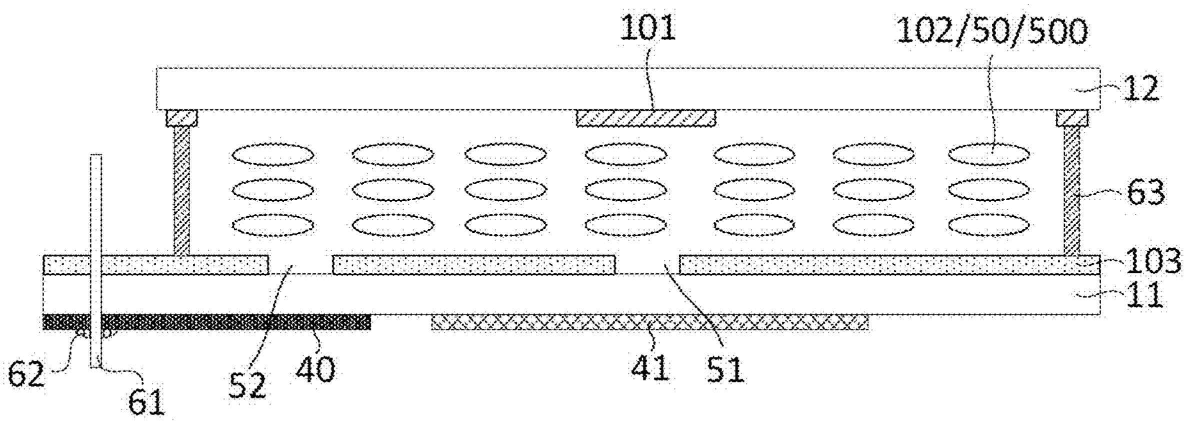
FIG. 15 is a schematic diagram of a partial cross-sectional structure of an antenna provided by an embodiment of the present disclosure.

FIG. 14 is a structural schematic diagram of an antenna provided by an embodiment of the present disclosure, and FIG. 15 is a schematic diagram of a partial cross-sectional structure of an antenna provided by an embodiment of the present disclosure. As shown in FIGS. 14 and 15, optionally, the antenna further includes a feeding network 40 and radiating electrodes 41. The feeding network 40 is coupled to the phase-shifter wirings 101. Along the direction perpendicular to the plane of the grounding electrode layer 103, the grounding electrode layer 103 at least partially overlaps with the radiating electrodes 41. The grounding electrode layer 103 includes first hollows 51. Along the direction perpendicular to the plane of the grounding electrode layer 103, each of the phase-shifter wiring 101 at least partially overlaps with one of the first hollows 51, and each of the radiating electrodes 41 covers one of the first hollows 51.

Specifically, as shown in FIGS. 14 and 15, the radiating electrodes 41 can be located on one side of the ground metal layer 103 away from the phase-shifter wirings 101. The grounding electrode layer 103 is disposed with the first hollows 51. A vertical projection of each of the radiating electrodes 41 on the plane of the grounding electrode layer 103 covers one of the first hollows 51. The radio frequency signal is transmitted between the phase-shifter wirings 101 and the grounding electrode layer 103. The adjustable dielectric layer 102 between the phase-shifter wirings 101 and the grounding electrode layer 103 shifts the phase of the radio frequency signal to change the phase of the radio frequency signal. The phase-shifted radio frequency signal is coupled to the radiating electrodes 41 at the first hollows 51 of the grounding electrode layer 103, and the radiating electrodes 41 radiate the signal outward.

The shape, size parameters, etc. of each of the first hollows 51 can be set according to actual conditions, and are not limited in the embodiments of the present disclosure.

It should be noted that the radiating electrodes 41 can be disposed corresponding to the phase-shifting units 10. For example, the radiating electrodes 41 are disposed in one-to-one correspondence with the phase-shifting units 10, and the radiating electrodes 41 corresponding to different phase-shifting units 10 are disposed to be insulated from each other.

In other embodiments, the radiating electrodes 41 can also be located on one side of the phase-shifter wirings 101 away from the grounding electrode layer 103, that is, the phase shifter is disposed in an inverted manner. This is not limited in the embodiments of the present disclosure.

Continuing to refer to FIGS. 14 and 15, optionally, the antenna in the embodiment of the present disclosure further includes a feeding network 40. The feeding network 40 is configured to transmit the radio frequency signal to each of the phase-shifting units 10. The feeding network 40 can be distributed in a dendritic shape and include a plurality of branches, and one of the branches provides the radio frequency signal for one of the phase-shifting units 10.

As shown in FIGS. 14 and 15, the feeding network 40 can be arranged on the same layer as the radiating electrodes 41, that is, the feeding network 40 and the radiating electrodes 41 are disposed coplanarly. In this case, the feeding network 40 and the phase-shifter wirings 101 are located in different layers. Second hollows 52 can be disposed on the grounding electrode layer 103. A vertical projection of the feeding network 40 on the plane of the grounding electrode layer 103 at least partially overlaps with the second hollows 52, so that the radio frequency signal transmitted by the feeding network 40 is coupled to the phase-shifter wirings 101 at the second hollows 52 of the grounding electrode layer 103. In turn, by controlling the dielectric constant of the adjustable dielectric layer 102, the phase of the radio frequency signal on the phase-shifter wiring 101 can be shifted.

It should be noted that, in this embodiment, by disposing the feeding network 40 and the radiating electrodes 41 in the same layer, the feeding network 40 and the phase-shifter wirings 101 can be disposed separately, which helps to prevent the voltage signal transmitted in the phase-shifter wiring 101 from crosstalking between the phase-shifting units 10 and improves the reliability of the antenna operation.

In other embodiments, the feeding network 40 can also be disposed in the same layer as the phase-shifter wirings 101, that is, the feeding network 40 and the phase-shifter wirings 101 are disposed coplanarly. In this case, the feeding network 40 is coupled to the phase-shifter wirings 101. Compared with the situation where the radio frequency signal transmitted by the feeding network 40 is coupled to the phase-shifter wirings 101 through the adjustable dielectric layer 102, the feeding network 40 can directly transmit the radio frequency signal to the phase-shifter wirings 101, thereby reducing the loss of the radio frequency signal and improving the performance of the antenna. This is not limited specifically in the embodiments of the present disclosure.

Continuing to refer to FIGS. 14 and 15, optionally, the antenna provided by the embodiment of the present disclosure further includes radio frequency signal interfaces 61 and pads 62. One end of each of the radio frequency signal interfaces 61 is connected to the feeding network 40 and fixed through one of the pads 62, and the other end of each of the radio frequency signal interface 61 is configured to connect to an external circuit such as a high-frequency connector. The above-mentioned radio frequency signal interfaces 61 can be set according to actual conditions, and what is shown in FIGS. 14 and 15 is only an optional setting manner.

Continuing to refer to FIGS. 14 and 15, optionally, the phase shifter further includes a rubber frame 63. The rubber frame 63 is disposed around the adjustable dielectric layer 102 and can be configured to support the first substrate 11 and the second substrate 12, thereby providing an accommodation space for the adjustable dielectric layer 102 and sealing the adjustable dielectric layer 102.

It should be understood that various forms of processes shown above can be used to re-order, add, or delete steps. For example, the steps recited in the present disclosure can be executed in parallel, sequentially, or in a different order, as long as the desired results of the technical solutions of the present disclosure can be achieved. This is not limited herein.

The above-mentioned specific implementations do not constitute a limitation on the protection scope of the present disclosure. Those of skill in the art should understand that various modifications, combinations, sub-combinations, and substitutions can be made according to design requirements and other factors. Any modifications, equivalent substitutions, and improvements made within the spirit and principle of the present disclosure should be included in the protection scope of the present disclosure.

What is claimed is:

1. A phase shifter, comprising at least one phase-shifting unit;

wherein the phase-shifting unit comprises a phase-shifter wiring, an adjustable dielectric layer, and a grounding electrode layer, the phase-shifter wiring and the grounding electrode layer are disposed opposite to each other, and the adjustable dielectric layer is located between the phase-shifter wiring and the grounding electrode layer;

the phase-shifter wiring comprises at least one transmission unit;

the transmission unit comprises a first wiring segment and a second wiring segment that are connected to each other, and a first via-hole is formed on the grounding electrode layer;

along a direction perpendicular to a plane of the grounding electrode layer, the first via-hole covers the first wiring segment, and the grounding electrode layer covers the second wiring segment;

along a first direction, a length of the second wiring segment is greater than a length of the first wiring segment; and the first direction is perpendicular to an extension direction of the phase-shifter wiring.

2. The phase shifter according to claim 1, wherein, along the first direction, the first wiring segment comprises a first boundary and a second boundary that are opposite to each other, and the second wiring segment comprises a third boundary and a fourth boundary that are opposite to each other; and along the first direction, the third boundary is located on one side of the first boundary away from the second boundary, and the fourth boundary is located on one side of the second boundary away from the first boundary.

3. The phase shifter according to claim 2, wherein, along the first direction, a distance between the third boundary and the first boundary is equal to a distance between the fourth boundary and the second boundary.

4. The phase shifter according to claim 1, wherein, along the first direction, a length of the first via-hole is greater than or equal to the length of the first wiring segment.

5. The phase shifter according to claim 4, wherein, the first via-hole comprises a first via-hole subsection, a second via-hole subsection, and a third via-hole subsection that are connected to each other, the first via-hole subsection, the second via-hole subsection, and the third via-hole subsection are arranged in sequence along the first direction;

along the direction perpendicular to the plane of the grounding electrode layer, the second via-hole subsection overlaps with the first wiring segment; and along the extension direction of the phase-shifter wiring, a length of the second via-hole subsection is less than a length of the first via-hole subsection, and is less than a length of the third via-hole subsection.

6. The phase shifter according to claim 1, wherein, the phase-shifter wiring comprises a first wiring subsection, a second wiring subsection, and a third wiring subsection;

the first wiring subsection comprises at least one transmission unit, and transmission units in the first wiring subsection are connected in sequence along a third direction;

the third wiring subsection comprises at least one transmission units, and transmission units in the third wiring subsection are connected in sequence along a fourth direction;

the third direction and the fourth direction intersect;

the second wiring subsection is connected between the first wiring subsection and the third wiring subsection; and the second wiring subsection comprises one transmission unit.

7. The phase shifter according to claim 6, wherein, the at least one transmission unit in the first wiring subsection and the at least one transmission unit in the third wiring subsection are first transmission units;

the transmission unit in the second wiring subsection is a second transmission unit; and the first transmission units and the second transmission unit have a same impedance.

8. The phase shifter according to claim 7, wherein, the first wiring segment and the first via-hole form an equivalent inductance;

the second wiring segment and the grounding electrode layer opposite to the second wiring segment form an equivalent capacitance;

in one of the first transmission units, an inductance value of the equivalent inductance is L1, and a capacitance value of the equivalent capacitance is C1; and in the second transmission unit, the inductance value of the equivalent inductance is L2, and the capacitance value of the equivalent capacitance is C2;

$$\text{where } L1/C1 = L2/C2.$$

9. The phase shifter according to claim 8, wherein, L1=L2, and C1=C2.

10. The phase shifter according to claim 6, wherein, the transmission units in the first wiring subsection and the third wiring subsection are first transmission units;

the transmission unit in the second wiring subsection is a second transmission unit; and an electrical length of one of the first transmission units is equal to an electrical length of the second transmission unit.

11. The phase shifter according to claim 6, wherein, the at least one transmission unit in the first wiring subsection and the at least one transmission unit in the third wiring subsection are first transmission units;

the transmission unit in the second wiring subsection is a second transmission unit;

in one of the first transmission units, along the first direction, a length of the first via-hole is D1; and in the second transmission unit, along the first direction, the length of the first via-hole is D2, where D2<D1.

12. The phase shifter according to claim 6, wherein, the transmission unit in the second wiring subsection is a second transmission unit; and in the second transmission unit, along the first direction, a length of the first via-hole is D2, and a length of the second wiring segment is D3, where D2≤D3.

13. The phase shifter according to claim 6, wherein,
the at least one transmission unit in the first wiring subsection and the at least one transmission unit in the third wiring subsection are first transmission units;
the transmission unit in the second wiring subsection is a second transmission unit;
in one of the first transmission units, along the first direction, a length of the first wiring segment is D4; and
in the second transmission unit, along the first direction, a length of the first wiring segment is D5, where D5<D4.

14. The phase shifter according to claim 6, wherein,
the at least one transmission units in the first wiring subsection and the at least one transmission unit in the third wiring subsection are first transmission units;
the transmission unit in the second wiring subsection is a second transmission unit;
in one of the first transmission units, along the extension direction of the phase-shifter wiring, the length of the first wiring segment is D6; and
in the second transmission unit, along the extension direction of the phase-shifter wiring, a length of the first wiring segment is D7, where D7>D6.

15. The phase shifter according to claim 6, wherein,
the transmission unit in the second wiring subsection is a second transmission unit;
in the second transmission unit, the first wiring segment comprises a first sub-segment and a second sub-segment that are connected to each other, the first sub-segment extends along the third direction, and the second sub-segment extends along the fourth direction.

16. The phase shifter according to claim 15, wherein,
in the second transmission unit, along the first direction, the first sub-segment comprises a fifth boundary and a sixth boundary that are opposite to each other, and the second sub-segment comprises a seventh boundary and an eighth boundary that are opposite to each other;
in the second transmission unit, the first wiring segment further comprises a first chamfered boundary and a second chamfered boundary;
the first chamfered boundary is connected between the fifth boundary and the seventh boundary, and an angle between the first chamfered boundary and the fifth boundary is an obtuse angle, and an angle between the first chamfered boundary and the seventh boundary is an obtuse angle; and
the second chamfered boundary is connected between the sixth boundary and the eighth boundary, and an angle between the second chamfered boundary and the sixth boundary is an obtuse angle, and an angle between the second chamfered boundary and the eighth boundary is an obtuse angle.

17. The phase shifter according to claim 6, wherein,
the transmission unit in the second wiring subsection is a second transmission unit; and
in the second transmission unit, the first wiring segment is an arc.

18. The phase shifter according to claim 6, wherein,
the transmission unit in the second wiring subsection is a second transmission unit; and
in the second transmission unit, the first wiring segment is a straight line.

19. An antenna, comprising a phase shifter, wherein the phase shifter comprises at least one phase-shifting unit;
wherein the phase-shifting unit comprises a phase-shifter wiring, an adjustable dielectric layer, and a grounding electrode layer, the phase-shifter wiring and the grounding electrode layer are disposed opposite to each other, and the adjustable dielectric layer is located between the phase-shifter wiring and the grounding electrode layer;
the phase-shifter wiring comprises at least one transmission unit;
the transmission unit comprises a first wiring segment and a second wiring segment that are connected to each other, and a first via-hole is formed on the grounding electrode layer;
along a direction perpendicular to a plane of the grounding electrode layer, the first via-hole covers the first wiring segment, and the grounding electrode layer covers the second wiring segment;
along a first direction, a length of the second wiring segment is greater than a length of the first wiring segment; and
the first direction is perpendicular to an extension direction of the phase-shifter wiring.

20. The antenna according to claim 19, wherein,
the antenna further comprises a feeding network and a radiating electrode;
the feeding network is coupled to the phase-shifter wiring;
in the direction perpendicular to the plane of the grounding electrode layer, the grounding electrode layer at least partially overlaps with the radiating electrode; and
the grounding electrode layer comprises a first hollow, and along the direction perpendicular to the plane of the grounding electrode layer, the phase-shifter wiring at least partially overlaps with the first hollow, and the radiating electrode covers the first hollow.

* * * * *